United States Patent
Kozawa et al.

(10) Patent No.: US 9,804,912 B2
(45) Date of Patent: Oct. 31, 2017

(54) LOG MANAGEMENT APPARATUS, COMPUTER-READABLE RECORDING MEDIUM HAVING STORED THEREIN LOG MANAGEMENT PROGRAM, AND LOG MANAGEMENT METHOD

(71) Applicant: FUJITSU LIMITED, Kawasaki-shi, Kanagawa (JP)

(72) Inventors: Kazuaki Kozawa, Hekinan (JP); Kenichi Narita, Nagoya (JP); Yuji Aoki, Nagoya (JP); Norio Inoue, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 14/833,522

(22) Filed: Aug. 24, 2015

(65) Prior Publication Data
US 2016/0098312 A1    Apr. 7, 2016

(30) Foreign Application Priority Data
Oct. 6, 2014   (JP) .................. 2014-205755

(51) Int. Cl.
*G06F 11/07*   (2006.01)

(52) U.S. Cl.
CPC ........ *G06F 11/079* (2013.01); *G06F 11/0715* (2013.01); *G06F 11/0751* (2013.01); *G06F 11/0778* (2013.01); *G06F 11/0787* (2013.01)

(58) Field of Classification Search
USPC ........................................ 714/45
See application file for complete search history.

(56) References Cited

U.S. PATENT DOCUMENTS

| | | | |
|---|---|---|---|
| 8,046,639 B1 * | 10/2011 | Nordin | G06F 11/2268 714/32 |
| 8,069,366 B1 * | 11/2011 | Wenzel | H04L 41/069 711/147 |
| 2004/0148327 A1 | 7/2004 | Satomi et al. | |
| 2004/0148389 A1 * | 7/2004 | Satomi | H04L 41/22 709/224 |
| 2005/0102564 A1 * | 5/2005 | Oeda | G06F 11/3476 714/20 |

(Continued)

FOREIGN PATENT DOCUMENTS

| | | |
|---|---|---|
| JP | 2004-227360 | 8/2004 |
| JP | 2008-140248 | 6/2008 |

(Continued)

*Primary Examiner* — Kamini Patel
(74) *Attorney, Agent, or Firm* — Fujitsu Patent Center

(57) ABSTRACT

A non-transitory computer-readable recording medium having stored therein a log management program that causes a computer to execute a process includes obtaining a log item group included in each log and having a periodicity, for each of a plurality of logs outputted from a plurality of monitoring targets, detecting a first log item group from a first log, the first log item group being different from the log item group included in the first log, specifying a second log item group outputted in a same period as that of the first log item group, from a second log related to the first log, extracting the first log item group from the first log, and outputting the first log item group, and extracting the specified second log item group from the second log, and outputting the second log item group.

18 Claims, 20 Drawing Sheets

(56) References Cited

U.S. PATENT DOCUMENTS

| | | | | |
|---|---|---|---|---|
| 2008/0178042 | A1* | 7/2008 | Mochizuki | G05B 19/4184 |
| | | | | 714/25 |
| 2010/0121908 | A1* | 5/2010 | Nulkar | H04L 41/044 |
| | | | | 709/203 |
| 2010/0257510 | A1* | 10/2010 | Horley | G06F 11/3632 |
| | | | | 717/128 |
| 2014/0298114 | A1* | 10/2014 | Aoki | G06F 11/2028 |
| | | | | 714/48 |
| 2015/0355996 | A1* | 12/2015 | Smith | G06F 11/3636 |
| | | | | 717/128 |

FOREIGN PATENT DOCUMENTS

| | | |
|---|---|---|
| JP | 2008-158634 | 7/2008 |
| JP | 2010-182194 | 8/2010 |
| JP | 2013-206147 | 10/2013 |

* cited by examiner

FIG. 8

ACTIVATION →

========== APA_CO Main START ==========
key[Communication_Define:CONNECT_TYPE] not found or ERROR[-1]
key[Communication_Define:DISCTIME2] not found or ERROR[-1]

ONE CYCLE {
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
WARNING : Event_LOG Index Size Get Error![/var/opt/FJSVsapag/
WARNING : Event_LOG Index Size Get Error![/var/opt/FJSVsapag/
WARNING : Event_LOG Index Size Get Error![/var/opt/FJSVsapag/
ERROR : Event_LOG Index Size Get Error![/var/opt/FJSVsapag/
}

ONE CYCLE {
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
WARNING : Event_LOG Index Size Get Error![/var/opt/FJSVsapag/
WARNING : Event_LOG Index Size Get Error![/var/opt/FJSVsapag/
WARNING : Event_LOG Index Size Get Error![/var/opt/FJSVsapag/
ERROR : Event_LOG Index Size Get Error![/var/opt/FJSVsapag/
}

ONE CYCLE {
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
WARNING : Event_LOG Index Size Get Error![/var/opt/FJSVsapag/
· · ·OMIT· · ·
}

41

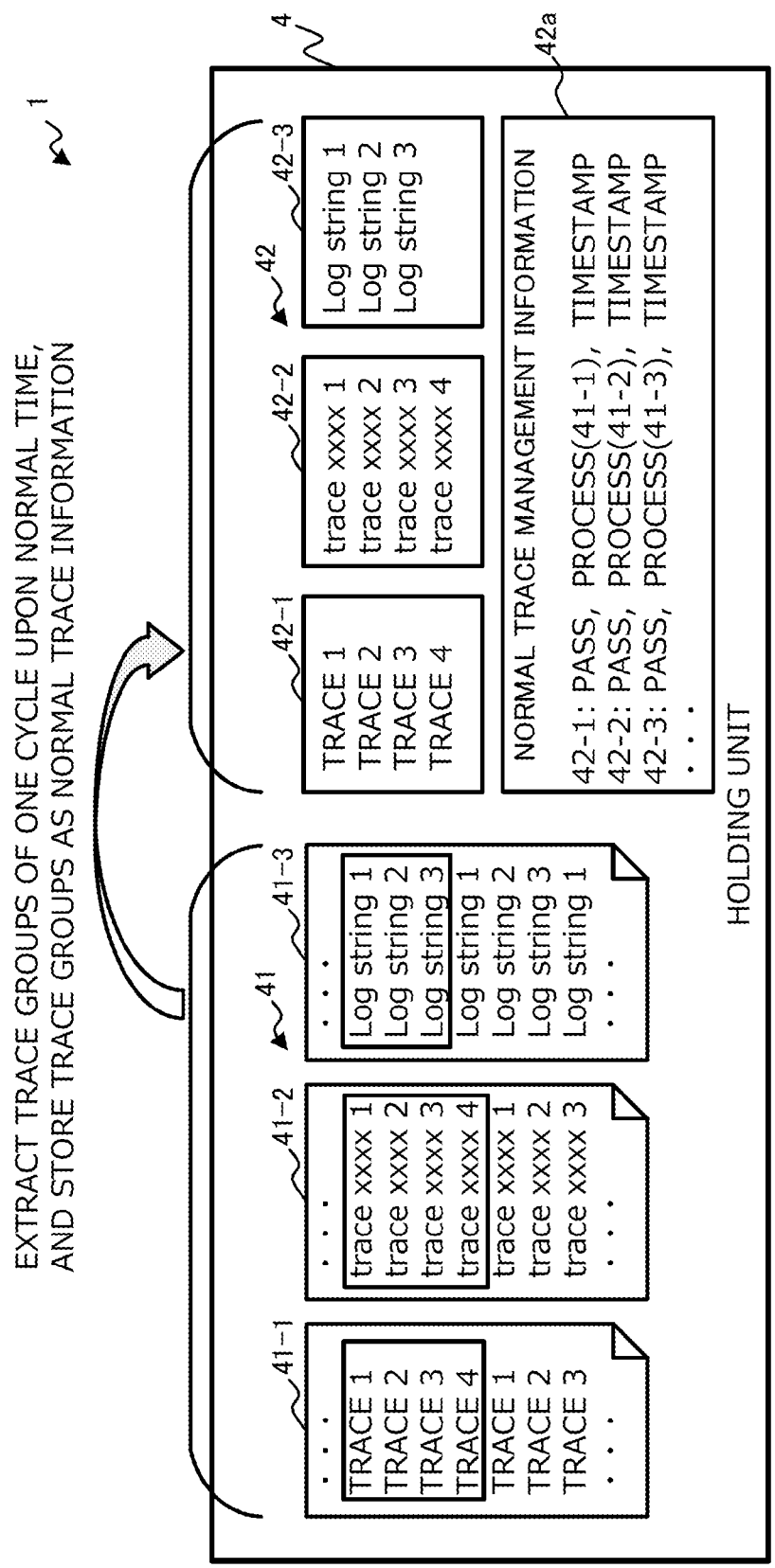

FIG. 11

ACTIVATION
⇨ ========== APA_CO Main START ==========
key[Communication_Define:CONNECT_TYPE] not found or ERROR[-1]
key[Communication_Define:DISCTIME2] not found or ERROR[-1]

ONE CYCLE
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
WARNING : Event_LOG Index Size Get Error![/var/opt/FJSVsapag/
WARNING : Event_LOG Index Size Get Error![/var/opt/FJSVsapag/
WARNING : Event_LOG Index Size Get Error![/var/opt/FJSVsapag/
ERROR : Event_LOG Index Size Get Error![/var/opt/FJSVsapag/

ONE CYCLE
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
WARNING : Event_LOG Index Size Get Error![/var/opt/FJSVsapag/
WARNING : Event_LOG Index Size Get Error![/var/opt/FJSVsapag/
WARNING : Event_LOG Index Size Get Error![/var/opt/FJSVsapag/
ERROR : Event_LOG Index Size Get Error![/var/opt/FJSVsapag/

ONE CYCLE
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
WARNING : Event_LOG Index Size Get Error![/var/opt/FJSVsapag/
WARNING : Event_LOG Index Size Get Error![/var/opt/FJSVsapag/
WARNING : Event_LOG Index Size Get Error![/var/opt/FJSVsapag/
ERROR : Event_LOG Index Size Get Error![/var/opt/FJSVsapag/

ONE CYCLE INCLUDING ANOMALOUS TRACE
* APA_COTh_Internal_Receive start *
WARNING : file[/var/opt/FJSVsapag/dat/APA_CO_RetryEvent]_stat
INFO : Not CLUSTER
INFO : [/opt/FJSVsapag/dat/APA_MAstartap.dat]Finded EOF errno
APA_CMfilegets error or EOF filename[/var/opt/FJSVsapag/dat/
WARNING : Event_LOG Index Size Get Error![/var/opt/FJSVsapag/
WARNING : Event_LOG Index Size Get Error![/var/opt/FJSVsapag/
WARNING : Event_LOG Index Size Get Error![/var/opt/FJSVsapag/
ERROR : Event_LOG Index Size Get Error![/var/opt/FJSVsapag/

LOG MANAGEMENT APPARATUS, COMPUTER-READABLE RECORDING MEDIUM HAVING STORED THEREIN LOG MANAGEMENT PROGRAM, AND LOG MANAGEMENT METHOD

CROSS-REFERENCE TO RELATED APPLICATION

This application is based upon and claims the benefit of priority of the prior Japanese Patent Application No. 2014-205755, filed on Oct. 6, 2014, the entire contents of which are incorporated herein by reference.

FIELD

The embodiments discussed herein are related to a log management apparatus, a recording medium having stored therein a log management program, and a log management method.

BACKGROUND

Information processing apparatuses such as servers, Personal Computer (PCs) or various terminals can accumulate log data such as traces outputted from monitoring targets such as (firmware of) devices or applications, as files (log files) in storage apparatuses. A log file accumulated in a storage apparatus is used by a manager or an operator (collectively referred to as a manager below) of an information processing apparatus to investigate (identify) a failure cause when, for example, a failure occurs in the information processing apparatus (monitoring target).

In addition, techniques of extracting one or more logs matching conditions, from one or more log files are known as related techniques (see, for example, Patent Documents 1 to 3 and 5 listed below). Further, a technique of extracting log data related to a failure indicated by a received trigger among log data stored in a ring buffer, and recording the extracted log data in an auxiliary storage apparatus is also known (see, for example, Patent Document 4 listed below).

Patent Document 1: Japanese Laid-open Patent Publication No. 2004-227360
Patent Document 2: Japanese Laid-open Patent Publication No. 2008-140248
Patent Document 3: Japanese Laid-open Patent Publication No. 2010-182194
Patent Document 4: Japanese Laid-open Patent Publication No. 2013-206147
Patent Document 5: Japanese Laid-open Patent Publication No. 2008-158634

Log data (one or more log items; log item group) included in a log file is useful to investigate a failure cause. In addition, a log item is one unit of a log used to investigate a failure cause. The log data used to investigate a failure cause preferably includes log data outputted from a monitoring target in which a failure has occurred, and log data outputted from monitoring targets other than the monitoring target in which the failure has occurred. This allows a manager to easily and accurately investigate (identify) a cause instead of referring to single log data outputted from the monitoring target in which the failure has occurred.

However, a size of a log file and the number of files increase as the time passes, and tightens a storage capacity of a storage apparatus tight. Therefore, an information processing apparatus has difficulty in accumulating all past log files. Hence, for example, as illustrated in FIG. 20, an information processing apparatus deletes (overwrites) old log files in the storage apparatus after a certain period of time passes or after log files of a certain capacity are accumulated. In addition, FIG. 20 illustrates an example where, among log files accumulated in order of log files A, B, C and D in a storage apparatus, the log file A is overwritten by the log file C in (2) and the log file B is overwritten by the log file D in (3).

Hence, the information processing apparatus preferably accumulates (outputs) log data which has been outputted from a monitoring target in which a failure has occurred and relates to the failure without deleting the log data while the capacity of the storage apparatus is limited.

By the way, when a failure occurs in the information processing apparatus, a manager does not necessarily investigate a failure cause immediately after the failure occurs, and investigates the failure cause after the time passes from the occurrence of the failure. In this case, even when the manager tries to investigate the failure cause, log date related to the failure has already been deleted from the information processing apparatus, and therefore it is difficult to investigate the failure cause.

In an example of FIG. 20, the log files are cyclically overwritten in order of (1), (2) and (3). Therefore, when the shaded log file B includes log data related to a failure, the log file B is overwritten by the log file D at the timing of (3).

To prevent log data related to a failure from being lost, for example, the above related technique may be used to cause the information processing apparatus to extract log data related to a failure, from a log file, and store the extracted data in the storage apparatus. However, in the following illustrative cases, it is difficult to cause the information processing apparatus to extract and store (output) appropriate log data.

A character string (e.g. "error" or "warning") which the information processing apparatus recognizes as a failure is not included in log data related to a failure.

Log data which is not outputted upon a normal time is outputted, and a determination material which allows the information processing apparatus to recognize the log data as a failure is not provided.

Log data which is outputted upon a normal time is defective.

Further, when the character string such as "error" or "warning" is included in log data which is not related to the failure, log data is normal yet the information processing apparatus determines that the log data as log data related to the failure in some cases.

SUMMARY

According to one aspect of the embodiments, a non-transitory computer-readable recording medium having stored therein a log management program that causes a computer to execute a process includes obtaining, for each of a plurality of logs, a log item group included in each log and having a periodicity, while the plurality of logs is outputted from a plurality of monitoring targets, respectively, detecting a first log item group from a first log, while the first log item group is different from the log item group included in the first log, specifying a second log item group from a second log related to the first log, while the second log item group is outputted in a same period as that of the first log item group, extracting the first log item group from the first log, and outputting the first log item group, and extracting the specified second log item group from the second log, and outputting the second log item group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a view illustrating an example of a trace file;

FIG. 9 is a view for explaining an example of a process of a normal trace obtaining unit;

FIG. 11 is a view illustrating an example of a trace file which is an analysis target;

DESCRIPTION OF EMBODIMENTS

Figure 1:
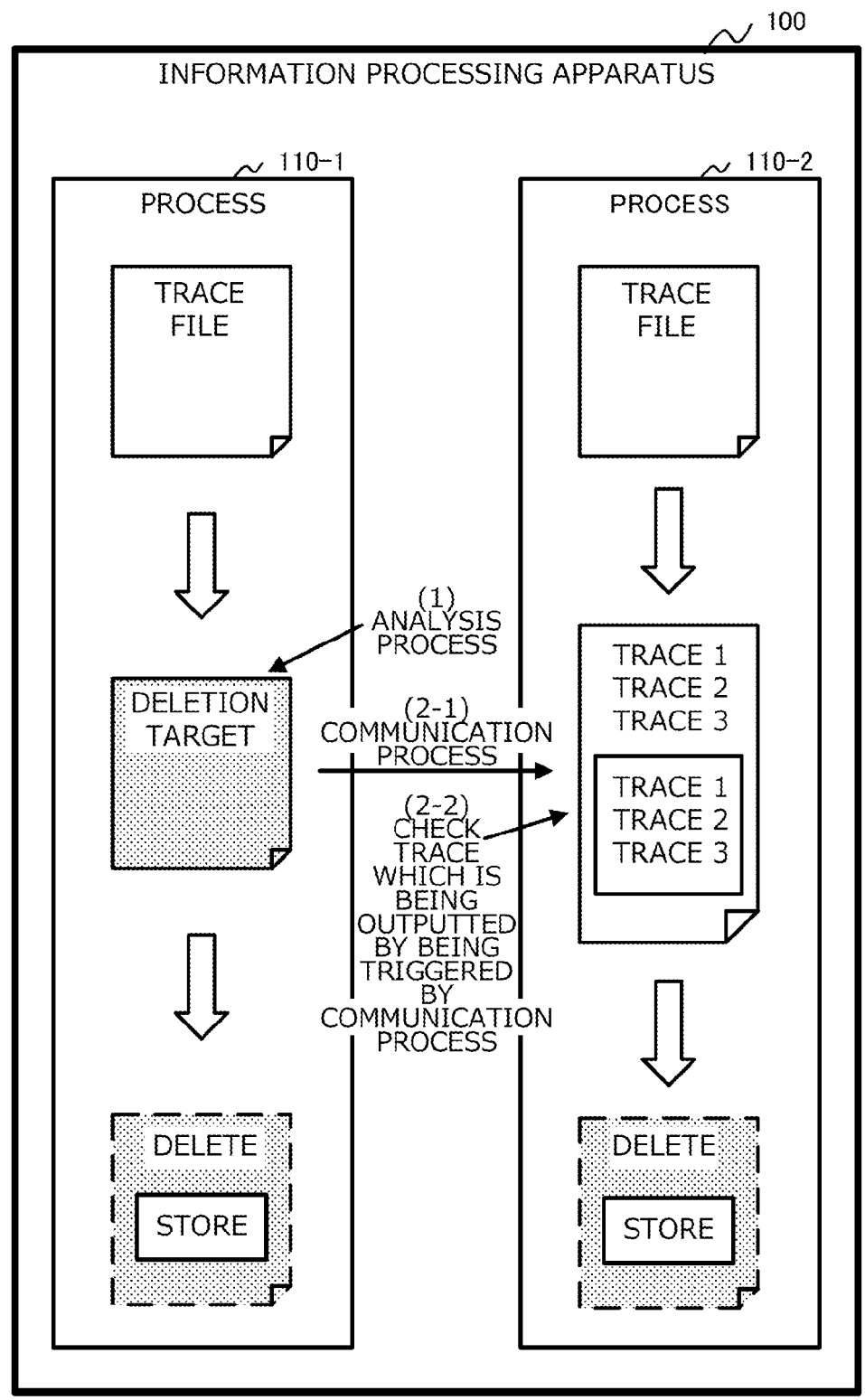
FIG. 1 is a view illustrating an example of log management performed by a process executed by an information processing apparatus.

An embodiment of the present invention will be described below with reference to the drawings. In this regard, the embodiment described below is an exemplary embodiment, and does not intend to exclude various modifications and an application of a technique which are not described below. That is, the present embodiment can be carried out by being variously deformed without departing from the spirit of the invention. In addition, portions which will be assigned same reference numerals in the drawings used in the following embodiment will represent same or similar portions.

[1] Comparative Example

First, the comparative example of one embodiment will be described with reference to FIGS. 1 to 4. As illustrated in FIG. 1, an information processing apparatus 100 executes processes 110-1 and 110-2 in a program executed by a processor such as a Central Processing Unit (CPU) which is not illustrated.

To allow a manager to investigate a failure (trouble) in a short period, the information processing apparatus 100 preferably segments and outputs multiple items of log data such as trace information (source passing portions or parameters) to clarify a source execution history of a monitoring target. However, when a capacity of a storage apparatus of the information processing apparatus 100 is limited, even if multiple items of log data are outputted, the number of files which can be accumulated in the storage apparatus is limited. Therefore, materials which are effective to investigate a failure cause are not necessarily left when a failure occurs. Further, when multiple items of log data are accumulated in the storage apparatus without limiting the capacity or by ignoring the capacity, a lack of the capacity of the storage apparatus causes deterioration of performance of the information processing apparatus 100.

Hence, as illustrated in FIG. 1, the process 110-1 performs a process of analyzing a deletion target file at a timing at which a trace file (log file) is deleted, and excluding only specific traces (log data) related to a failure, from the deletion target (see (1)).

Further, in addition to the above process (1) in the process 110-1, related traces (log data related to a failure) which relate to the specific trace outputted from the process 110-1 and are outputted from the other process 110-2 may be stored. When, for example, the specific trace is outputted from the process 110-1, the process 110-1 performs a communication process with respect to the process 110-2 and notifies an event (see (2-1)). Further, the process 110-2 is triggered by the communication process to check the related traces related to the specific trace of the process 110-1 based on a trace file which is being outputted (see (2-2)), and excludes the related traces from the deletion target trace file of the process 110-2 (keeps the related traces without deleting the related traces).

However, when the above process (1) is performed, the process 110-1 performs an analysis process on the deletion target to cause an influence such as delay on the original process of the process 110-1. Further, when the above processes (2-1) and (2-2) are performed, the process 110-2 checks the related traces, and corrects the process of the process 110-2 in a wide range to perform a process of applying marks for excluding traces from the deletion target (recognizing the traces as storage targets). Thus, a time to execute the original process of the process 110-2 increases to cause an influence such as delay.

For example, trace files deleted by the processes 110-1 and 110-2 once are 10 megabytes at maximum, respectively. In this case, the trace files of 10 megabytes are analyzed per digit to detect specific traces which the processes 110-1 and 110-2 exclude from the deletion targets. When this analysis process is performed by each of the processes 110-1 and 110-2, a long time is used for the analysis process, and the processes of the processes 110-1 and 110-2 are influenced.

A maximum size of trace files differs per program executed by the information processing apparatus 100. Therefore, trace files of several gigabytes are analyzed per digit in some cases. In this case, a file size is too big, and therefore it is difficult to expand trace files to a memory such as a Random Access Memory (RAM) and perform an analysis process. Hence, the information processing apparatus 100 generates an Input/Output (I/O) to the storage apparatus to expand the trace files to a storage apparatus such as a Hard Disk Drive (HDD) whose rate is lower than the memory to cause a negative influence such as a decrease in performance on the information processing apparatus 100 (system).

Further, even when specific traces or related traces (log data related to a failure) are stored in the processes 110-1 and 110-2, it is difficult to extract and store (output) appropriate traces in the information processing apparatus 100 in the following case.

(a) Traces are normal yet include character strings which the information processing apparatus 100 recognize as failures.

Figure 2:
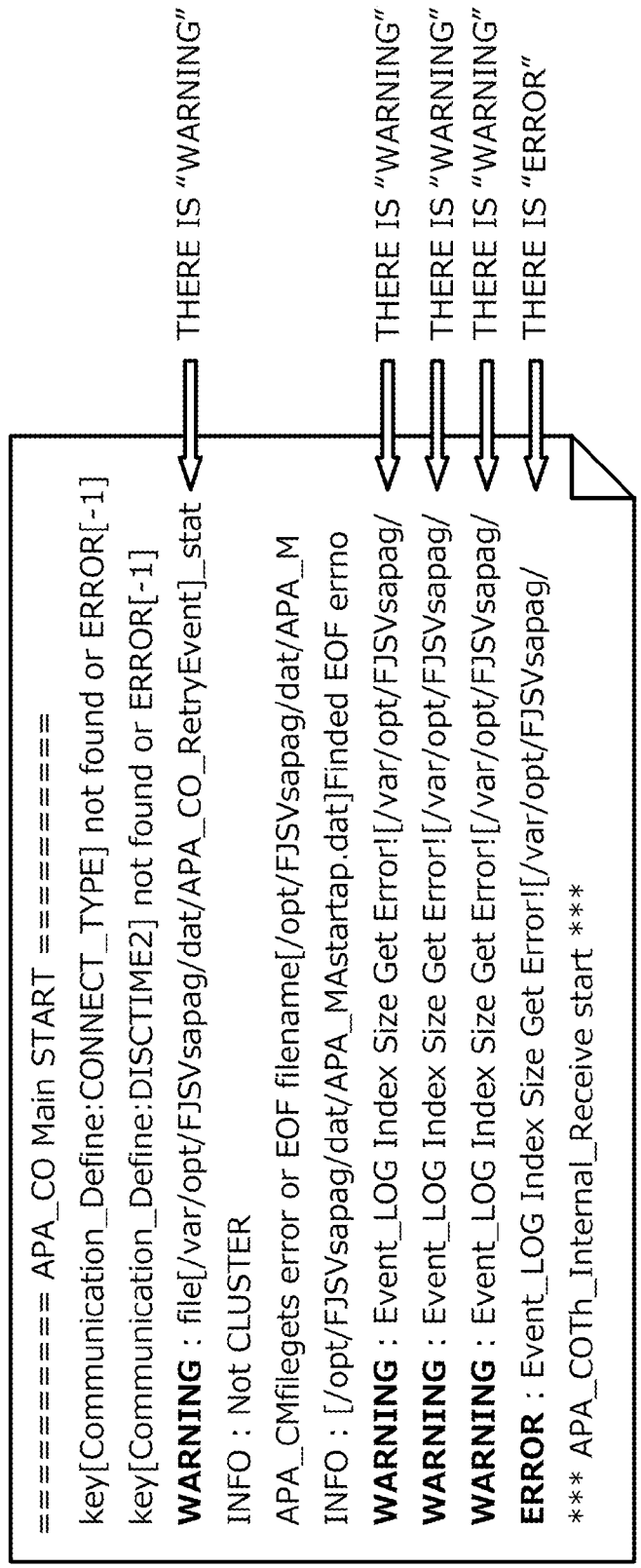
FIG. 2 is a view illustrating an output example of a trace.

As illustrated in FIG. 2, when a thread is launched (generated) in the process 110-1 or 110-2, traces include "ERROR" or "WARNING" in a normal case after the thread is launched. In this case, the information processing apparatus 100 determines traces including "ERROR" or "WARNING" illustrated in FIG. 2 as specific traces or related traces, and extracts and stores the traces.

(b) Traces are anomalous yet are not recognized as failures by the information processing apparatus 100.

Figure 3:
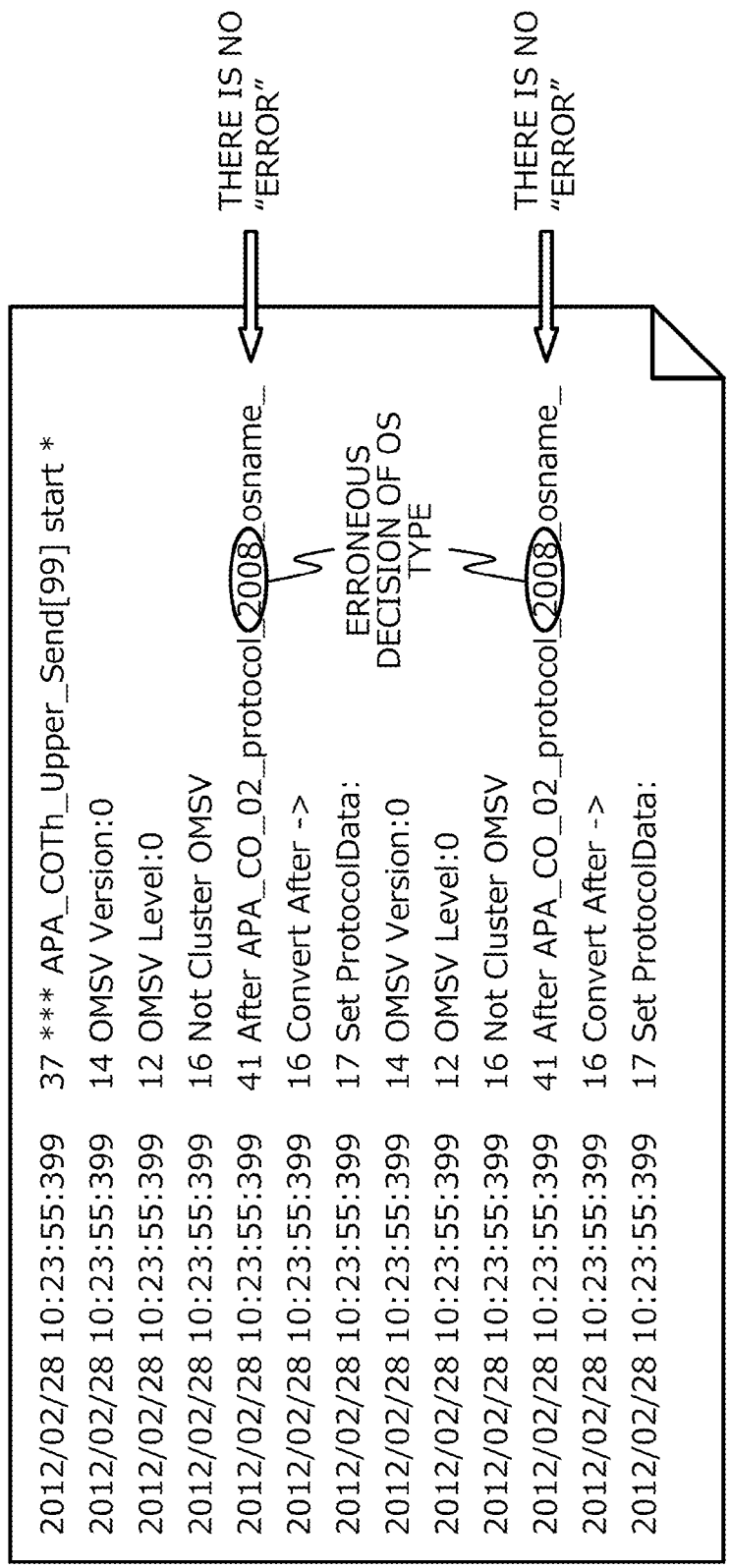
FIG. 3 is a view illustrating an output example of a trace.

As illustrated in FIG. 3, even in case of traces which do not include "ERROR" or "WARNING", traces which indicate that a thread erroneously determines a type of an Operating System (OS) is outputted as in a row of "After APA_CO_02_protocol_2008_osname_". In this case, the information processing apparatus 100 does not determine these traces as specific traces or related traces, and therefore has difficulty in extracting and storing the traces. Such a scene occurs in the following case.

Traces do not include character strings (e.g. "ERROR" or "WARNING") which the information processing apparatus 100 recognizes as a failure.

Traces which are not outputted upon a normal time are outputted, and there is no determination material which allows the information processing apparatus 100 to recognize the traces as failures (the information processing apparatus 100 does not recognize anomalous traces in advance).

(c) Traces have defective portions.

Figure 4:
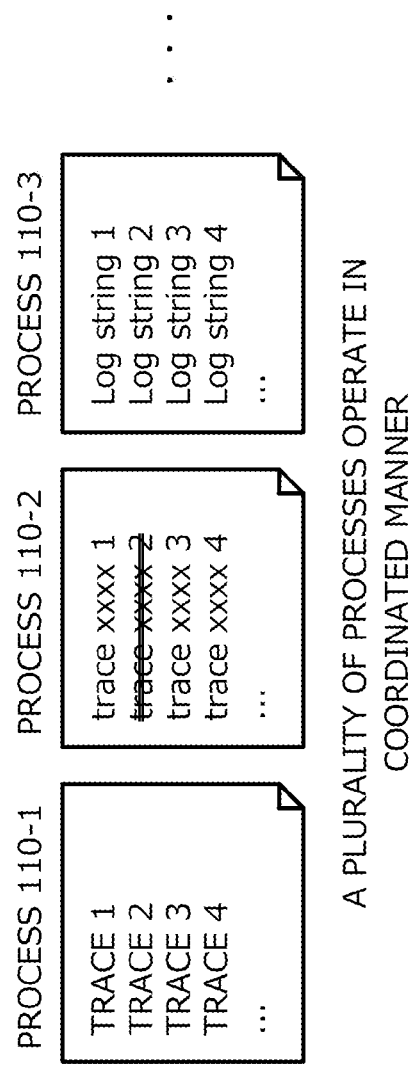
FIG. 4 is a view illustrating an example of traces outputted from a plurality of processes which operates in a coordinated manner.

As illustrated in FIG. 4, when a plurality of processes 110-1 to 110-3 operates in a coordinated manner, and when the process 110-2 does not output a trace of "trace xxxx 2", the information processing apparatus 100 has difficulty in recognizing a defective portion of the trace. For example, the process 110-1 has difficulty in detecting a defect of a trace even in the check process of the process 110-1 illustrated in FIG. 1, and the process 110-2 also has difficulty in checking related traces since there is no trigger from the process 110-1. In this case, the manager has difficulty in narrowing a doubtful failure portion or an influence range of a failure related to the defective trace.

Figure 5:
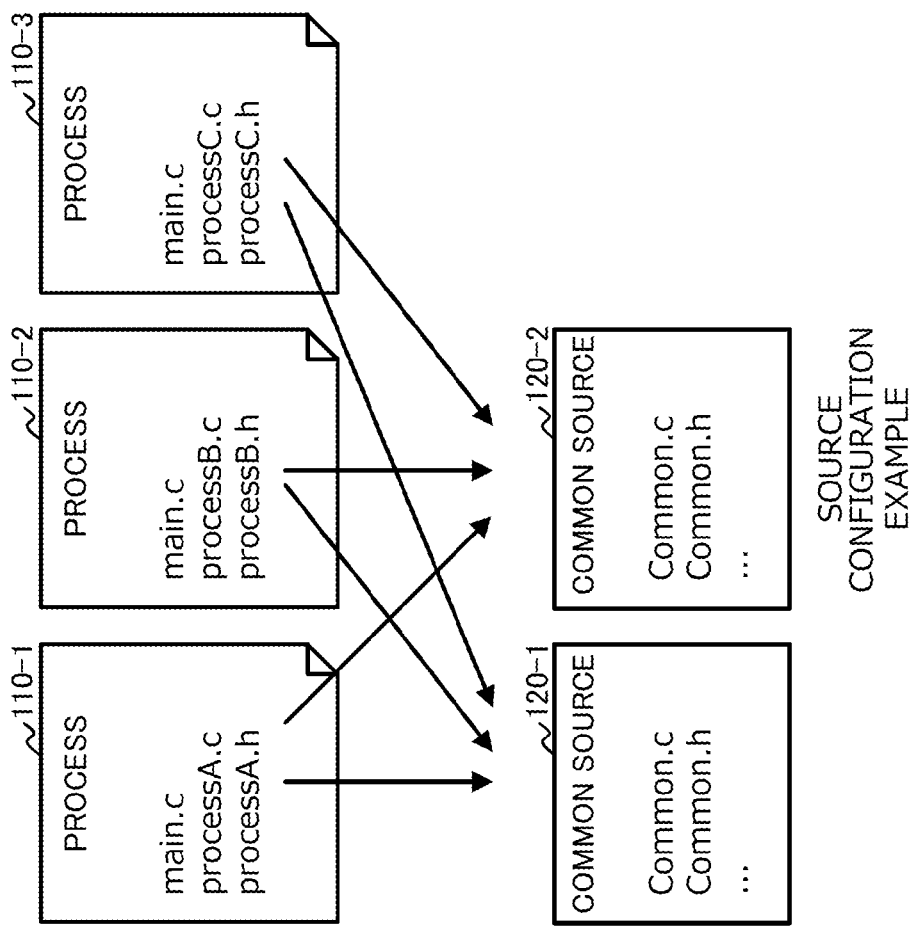
FIG. 5 is a view illustrating a configuration example of sources of the processes illustrated in FIG. 4.

Hereinafter, a case of above (c) where, when the processes 110-1 to 110-3 operate in a coordinated manner and provide one function as illustrated in FIG. 5, the information processing apparatus 100 can tentatively identify a trace defective portion will be described. In addition, in FIG. 5, the processes 110-1 to 110-3 use common sources 120-1 and 120-2, respectively. The common sources 120-1 and 120-2 are common functions used to compile the processes 110-1 to 110-3.

The traces of the processes 110-1 to 110-3 are outputted by using the common sources 120-1 and 120-2 (common functions). When the traces are not outputted from the common sources 120-1 and 120-2, the manager needs to investigate what operation the other processes 110-1 to 110-3 have performed at a time of a failure in order to investigate a failure cause. Hence, even when the information processing apparatus 100 detects that, for example, a trace "trace xxxx Y" which is outputted when the process 110-2 is normal, the manager has difficulty in identifying in which part of the common sources 120-1 and 120-2 a failure occurs, and narrowing an investigate range.

As described above, in the example illustrated in FIG. 1, the information processing apparatus 100 has difficulty in extracting and storing (outputting) specific traces and related traces without influencing an execution time (performance) of the original processes of the processes 110-1 and 110-2. Further, the information processing apparatus 100 has difficulty in extracting and storing (appropriate) traces useful to investigate a failure cause.

[2] One Embodiment

[2-1] Configuration Example of Information Processing Apparatus

Figure 6:
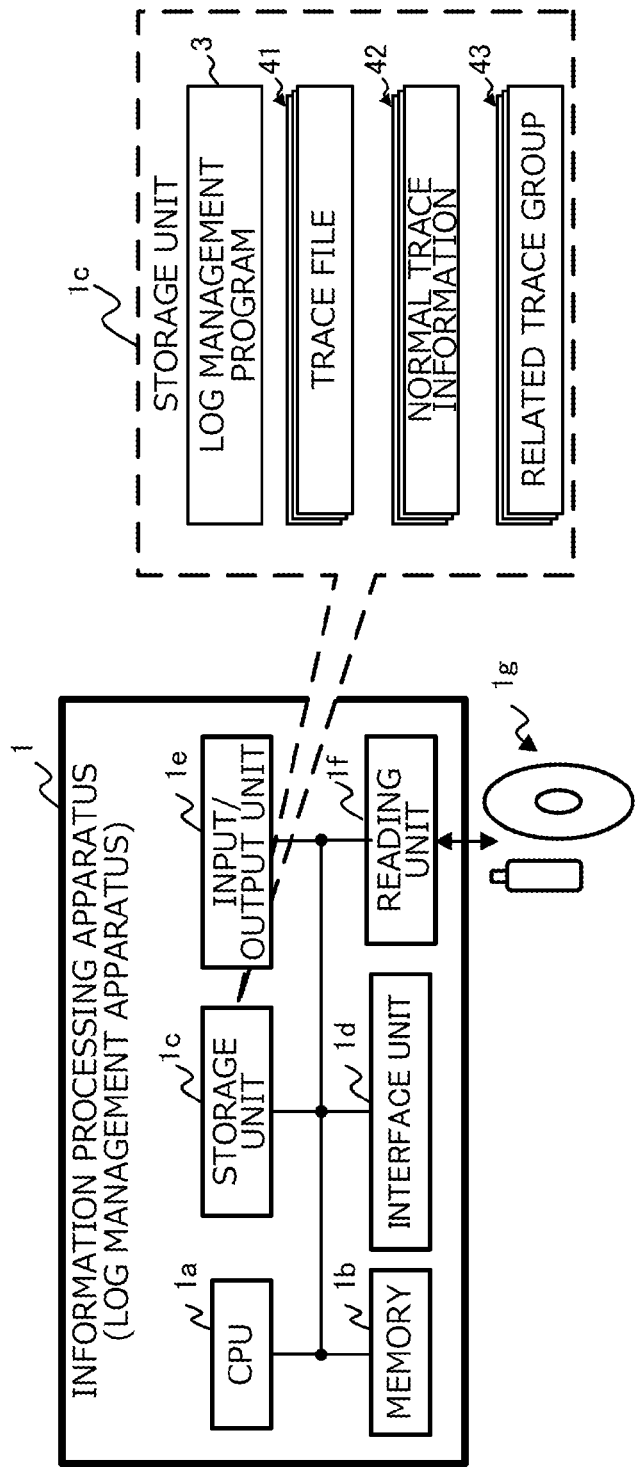
FIG. 6 is a view illustrating a hardware configuration example of the information processing apparatus as an example of one embodiment.
Figure 7:
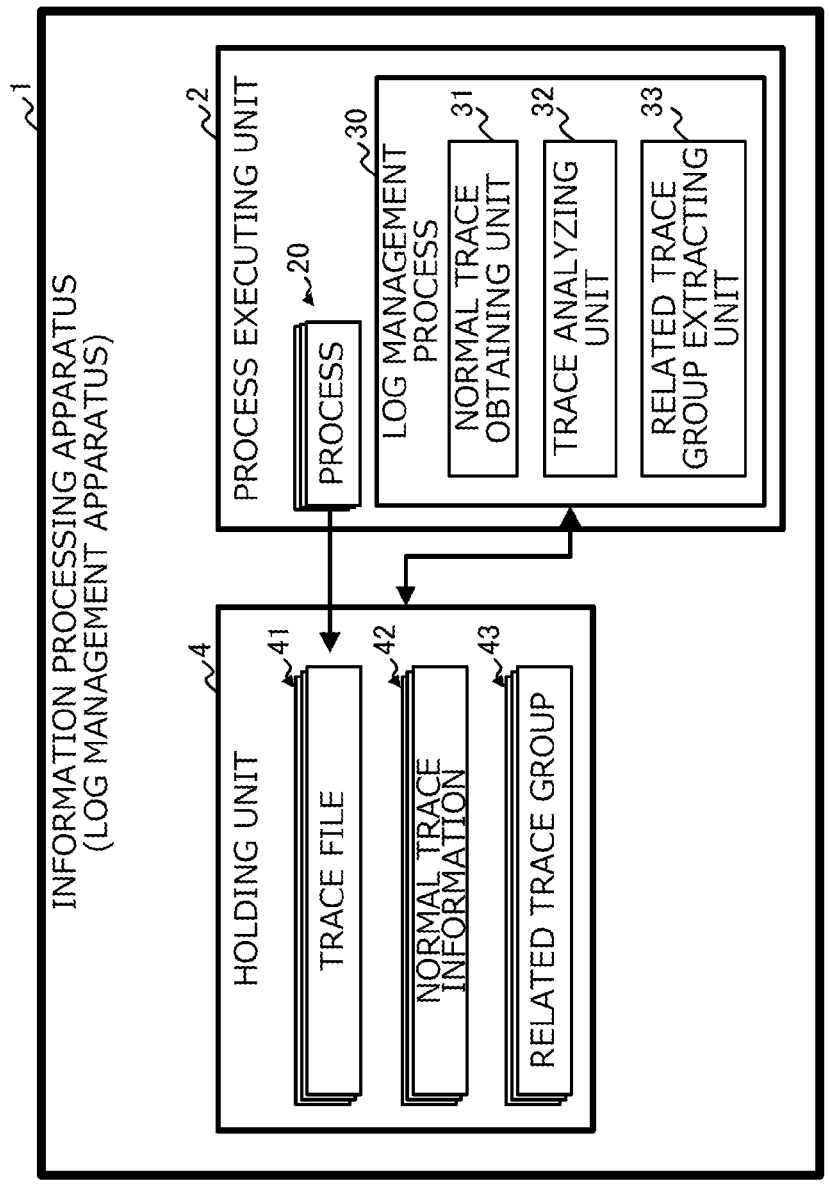
FIG. 7 is a view illustrating a functional configuration example of the information processing apparatus as an example of one embodiment.

The information processing apparatus (log management apparatus) according to one embodiment enables an output of appropriate log items related to a failure by a process described later. The information processing apparatus according to one embodiment will be described below. FIG. 6 is a view illustrating a hardware configuration example of an information processing apparatus 1 according to one embodiment. FIG. 7 is a view illustrating a functional configuration example of the information processing apparatus 1 according to one embodiment.

The information processing apparatus 1 is an apparatus which causes a processor such as a CPU to execute firmware, an OS and various programs such as applications operating on the OS. Further, in the present embodiment, the information processing apparatus 1 can recognize firmware, the OS, applications, devices in the information processing apparatus 1 and another information processing apparatus connected to the information processing apparatus 1 as monitoring targets, and manage logs outputted from the monitoring targets.

In addition, the information processing apparatus 1 includes various apparatuses such as computers including servers and PCs, terminals including smartphones, mobile telephones, tablets and Personal Digital Assistants (PDAs), and wearable devices such as wrist watches and eyeglasses.

The information processing apparatus 1 which manages a log outputted from an application as a monitoring target application which operates on the OS will be described.

(Hardware Configuration Example)

For example, as illustrated in FIG. 6, the information processing apparatus 1 includes a CPU 1*a*, a memory 1*b*, a storage unit 1*c*, an interface unit 1*d*, an input/output unit 1*e* and a reading unit 1*f*. The CPU 1*a* is an example of an arithmetic operation processing apparatus (processor) which performs various types of control and various arithmetic operations. The CPU 1*a* is connected to each of the corresponding blocks 1*b* to 1*f*, and can realize various functions by executing programs stored in the memory 1*b*, the storage unit 1*c*, a recording medium 1*g* and a Read Only Memory (ROM) which is not illustrated.

The memory 1*b* is a storage apparatus which stores various items of data and various programs. The CPU 1*a* stores and expands data or a program in the memory 1*b* when executing the program. In addition, the memory 1b is, for example, a volatile memory such as a RAM.

The storage unit 1c is hardware which stores various items of data and various programs. The storage unit 1c includes, for example, various apparatuses such as a magnetic disk apparatus including a HDD, a semiconductor drive apparatus including a Solid State Drive (SSD) or a non-volatile memory including a flash memory or a ROM.

In addition, the memory 1b or the storage unit 1c (the storage unit 1c in an example in FIG. 6) can store a log management program 3 which realize the entirety or part of various functions of the information processing apparatuses 1, trace files 41, normal trace information 42 and a related trace group 43 (see FIG. 7).

The interface unit 1d is a communication interface which controls connection and communication with a network and another information processing apparatus through a cable or wirelessly. The interface unit 1d is, for example, an adaptor which complies with a Local Area Network (LAN), a fibre channel (FC) or an InfiniBand. Further, another example of the interface unit 1d is an adaptor which complies with a Universal Serial Bus (USB), BLUETOOTH (registered trademark), a Peripheral Component Interconnect (PCI) or a PCI Express (PCIe). For example, the CPU 1a may store the log management program 3 obtained from the network through the interface unit 1d, in the storage unit 1c. Further, the CPU 1a may be accessibly connected with another information processing apparatus which is a monitoring target through the interface unit 1d.

The input/output unit 1e can include at least one of an input apparatus (an operation unit) such as a touch panel, a microphone for a voice operation, a mouse and a keyboard, and an output apparatus (display unit) such as a display, a speaker and a printer. For example, the input apparatus may be used to input various operations and data of the information processing apparatus by a user or a manager, and the output apparatus may be used to output various notifications or processing results.

The reading unit 1f is an apparatus which reads data or programs recorded in the computer-readable recording medium 1g. The log management program 3 may be stored in the recording medium 1g.

For example, the CPU 1a can realize a function of a log management apparatus (see FIG. 7) by expanding the log management program 3 stored in the storage unit 1c, to the storage apparatus such as the memory 1b, and executing the log management apparatus.

In addition, the recording medium 1g includes optical disks such as flexible discs, Compact Disc (CDs), Digital Versatile Disc (DVDs) and Blu-ray discs, and flash memories such as Universal Serial Bus (USB) memories and SD cards. In addition, the CDs include a CD-ROM, a CD-Recordable (CD-R) and a CD-Rewritable (CD-RW). Further, the DVDs include a DVD-ROM, a DVD-RAM, a DVD-R, a DVD-RW, a DVD+R and a DVD+RW.

The above blocks 1a to 1f are mutually connected through a bus to communicate with each other. Further, the above hardware configuration of the information processing apparatus 1 is an exemplary configuration. Hence, the number of items of hardware in the information processing apparatus 1 may be optionally increased or decreased (for example, arbitrary blocks may be added or omitted), or hardware may be divided or integrated by way of arbitrary combination, and a bus may be optionally added or omitted. For example, when the information processing apparatus 1 is a small apparatus such as a terminal or a wearable device, the memory 1b and the storage unit 1c may be integrated, or at least one of the interface unit 1d, the input/output unit 1e and the reading unit 1f may be omitted.

(Functional Configuration Example)

The information processing apparatus 1 configured as described above illustratively includes a process executing unit 2 and a holding unit 4 as illustrated in FIG. 7. The process executing unit 2 executes various programs (processes) in the information processing apparatus 1, and includes a plurality of processes 20 and a log management process 30 which manages logs outputted from the processes 20.

Each process 20 is an execution unit of a program (process) which is executed by the information processing apparatus 1. The processes 20 include a process of performing operation management and a monitoring process (demon process) of checking whether or not an application is alive. In this case, the process executing unit 2 is a managing unit which performs operation management on the information processing apparatus 1 or another apparatus. In addition, the processes 20 are not limited to the process which performs the operation management and may be various processes and modules.

Each process 20 can output various pieces of information related to a process of each process 20 as log data. In the present embodiment, each process 20 outputs the trace files (log file, log) 41 in one or more file formats as an example of log data, and stores the trace files 41 in the holding unit 4. Hyphens and numbers will be assigned to reference numeral 20 like processes 20-1, 20-2, and . . . below to represent the specific process 20.

The log management process 30 is an example of a log managing unit which manages a log (trace file 41) outputted from each of a plurality of processes 20, and extracts and outputs a log item from the log. The log management process 30 extracts and outputs one or more related trace group 43 as an example of log data related to a failure from the trace files 41 by a process described below. In addition, log data related to a failure is log data used to make determination to investigate whether a failure is caused by a failure of a monitoring target, a bug, a high load or user's erroneous recognition of a specification or to investigate a failure cause when a failure is caused by a failure of a monitoring target. The log management process 30 will be described in detail below.

The holding unit 4 is an example of a storage unit which stores logs outputted from each of a plurality of monitoring targets, and can illustratively hold (store) the trace files 41, the normal trace information 42 and the related trace group 43 as illustrated in FIG. 7. In addition, the holding unit 4 can be realized by the storage apparatus such as the memory 1b or the storage unit 1c illustrated in FIG. 6. Hyphens and numbers will be assigned to reference numeral 41 like trace files 41-1, 41-2 and . . . below to represent the specific trace file 41. The same also applies to the normal trace information 42 and the related trace group 43.

Traces which have been outputted until now since the process 20 or a thread has been launched (generated) can be set to the trace file 41 per process 20 or the threshold of the process 20, for example. As illustrated in FIG. 8, the trace files 41 include, for example, a trace which indicates activation of the process 20 or the threshold (the thread in this case) and traces which are repeatedly and continuously outputted. In addition, traces corresponding to one cycle will be referred to as a trace group below.

In this regard, a trace file (log) includes one or more log items. The log item is one log unit used to investigate a failure cause such as one row of a trace or one sentence of a minimum unit which has a meaning. In an example in FIG. 8, a trace of one row is a log item, and a trace group of one cycle is a log item group.

In addition, the trace files 41 accumulated in the holding unit 4 are cyclically deleted in order from, for example, the old trace file 41 from a point of view to secure a storage capacity of the information processing apparatus 1. A timing at which the trace files 41 is deleted differs per process 20 and, for example, after a predetermined period passes or when the trace files 41 reach a predetermined size, each process 20 can delete the old trace file 41 and generate the trace file 41 which is a next output destination. Alternatively, each process 20 may delete trace groups in the trace file 41 in order from an old trace group so as to prevent the trace file 41 as one trace file 41 which is an output destination from reaching a predetermined size.

The normal trace information 42 and the related trace group 43 will be described in explanation of the log management process 30.

[2-2] Configuration Example of Log Management Process

Next, a functional configuration example of the log management process 30 will be described. As illustrated in FIG. 7, the log management process 30 illustratively includes a normal trace obtaining unit 31, a trace analyzing unit 32 and a related trace group extracting unit 33.

The normal trace obtaining unit 31 obtains from a plurality of trace files 41 a trace group (log item group) of one cycle when a regular process is executed per trace file 41, and stores the obtained trace group as the normal trace information 42 in the holding unit 4.

When, for example, a monitoring target application is installed, the information processing apparatus 1 (process executing unit 2) determines that a newly added module is a relevant module. Further, when the relevant module outputs the trace file 41, the information processing apparatus 1 accumulates in the holding unit 4 the trace files 41 which have been outputted until a system (application) has been ended after the system has been activated. In this case, as illustrated in FIG. 9, the normal trace obtaining unit 31 can extract a trace group upon a normal time for each module (process 20), and store the trace group as the normal trace information 42 in the holding unit 4.

Further, when a patch is applied to an application and a module is replaced or even when a system configuration is changed, the module having the same name stored in the same path on the system is predicted to perform the same operation as that of the old module. However, in this case, character strings of traces are likely to change between new and old modules.

Hence, the normal trace obtaining unit 31 preferably associates and manages the path on the system, the module (process 20), information of a time stamp and the trace group upon the normal time (see normal trace management information 42a in FIG. 9). Thus, when the system configuration is changed, the normal trace obtaining unit 31 can extract a trace group upon the normal time again and store the trace group as the normal trace information 42 in the holding unit 4 based on normal trace management information 42a.

In addition, a trace group of one cycle can be determined as follows. For example, the normal trace obtaining unit 31 monitors a process such as command execution, thread creation and a file access which are executed on a regular basis by the process 20 which performs operation management. Further, the normal trace obtaining unit 31 specifies a trigger (a first trace (start) of a cycle) which starts one cycle by matching a regular operation (process) of the process 20 and a trace outputted at a timing of this operation. The normal trace obtaining unit 31 can improve accuracy of the trigger which starts one cycle by repeating the above process.

As described above, the normal trace obtaining unit 31 is an example of an obtaining unit which obtains a log item group having a periodicity included in a log per log outputted from each of a plurality of monitoring targets.

The trace analyzing unit 32 analyzes the trace files 41 accumulated in the holding unit 4, and detects anomalous traces in the trace files 41.

As described above, in the trace file 41, a trace group of the same one cycle (or a substantially same cycle except for a variable character string such as a time) is periodically recorded when a process of the process 20 is normally executed as indicated as "one cycle" in FIG. 8.

Hence, the trace analyzing unit 32 detects a trace group (log item group) of one cycle different from a trace group upon the normal time by comparing the trace file 41 outputted from the process 20 and the trace group upon the normal time, and determining a difference between the trace file 41 and the trace group. The trace group detected by the trace analyzing unit 32 includes anomalous traces related to a failure.

Figure 10:
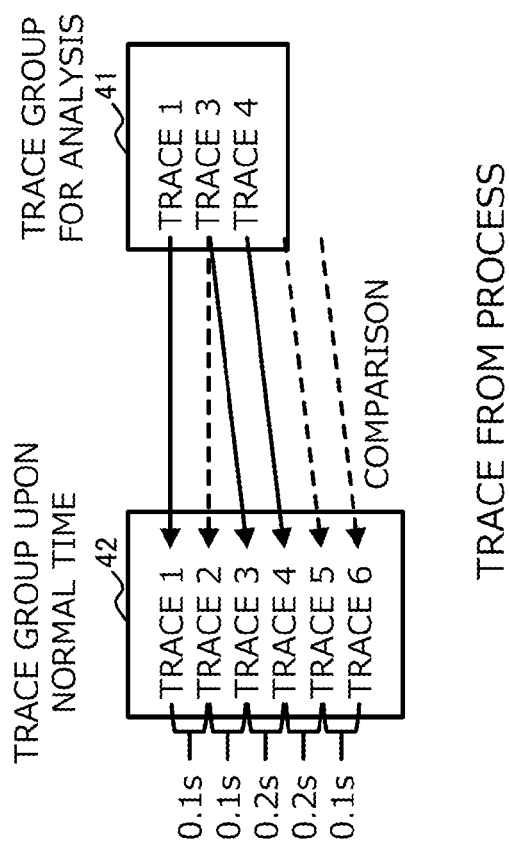
FIG. 10 is a view for explaining an example of a process of a trace analyzing unit.

For example, as illustrated in FIG. 10, the trace analyzing unit 32 compares an analysis trace group (trace files 41) from the process 20 and a trace group (normal trace information 42) of the process 20 upon the normal time, and determines the trace groups are the same or substantially the same. In an example in FIG. 10, the trace analyzing unit 32 determines that an analysis trace group does not include a "trace 2", a "trace 5" and a "trace 6", and detects the analysis trace group as a trace group (referred to as an anomalous trace group below) including anomalous traces from the trace file 41 which is an analysis target.

The trace analyzing unit 32 can evaluate a time interval at which a character string of each trace or each trace (traces 1 to 6 in the example in FIG. 10) is outputted upon comparison of the trace files 41 and the normal trace information 42. A character string of a trace is evaluated such as by evaluating that there is a row or a character string which exists only in one of traces or that character strings of both traces are different. The time interval is evaluated by evaluating whether or not the time interval at which each trace of the trace file 41 is spaced a predetermined rate or a predetermined time or more apart from a time interval of the corresponding normal trace information 42.

In addition, when detecting an anomalous trace group, the trace analyzing unit 32 notifies the related trace group extracting unit 33 of information indicating the trace group. This notifying method includes various methods of notifying a storage position (e.g. an address) of the detected trace group in the holding unit 4, or applying a mark to the detected trace group (e.g. setting an identifiable character string) and notifying information of the trace file 41 to which the mark has been applied.

In this regard, the trace analyzing unit 32 can extract a trace group of one cycle as an analysis trace group from the trace file 41 which is the analysis target, and use the trace group. When a plurality of cycles is included in the trace file 41 which is the analysis target, the trace analyzing unit 32 only needs to extract trace groups per one cycle from the trace file 41, and analyze each extracted cycle based on the normal trace information 42.

For example, as illustrated in FIG. 11, when the trace file 41 which is the analysis target includes a plurality of cycles, the trace analyzing unit 32 extracts a trace group per cycle. In the example in FIG. 11, first to third cycles (analysis trace group) are the same as the normal trace information 42. However, a trace (one row) of a fourth cycle (analysis trace group) encircled by a bold frame is not included in the normal trace information 42. In this case, the trace analyzing unit 32 detects the fourth cycle as an anomalous trace group.

By the way, the trace analyzing unit 32 recognizes as the trace file 41 which is the analysis target the trace file 41 selected based on predetermined conditions from a plurality of trace files 41 held in the holding unit 4. As described above, a timing at which the trace file 41 is deleted differs per trace file 41. In the present embodiment, the trace analyzing unit 32 can analyze the trace file 41 selected as a deletion target by the process 20 at a timing at which the trace file 41 is cyclically deleted.

The information processing apparatus 100 according to the above comparative example cyclically outputs trace files and deletes old trace files, and therefore deletes a trace related to a failure, too, in some cases. By contrast with this, the trace analyzing unit 32 recognizes the deletion target trace file 41 as the analysis target and, consequently, can reliably detect a trace group related to a failure before the trace file 41 is deleted.

When analyzing the trace file 41, the trace analyzing unit 32 can determine a trace group including a character string which is far from a normal trace, i.e., a trace group obtained when the process 20 executes a route (process) different from a normal route as an anomalous trace group. The trace different from that upon a normal time is highly likely to indicate or relate to a doubtful failure portion. Therefore, in case of an event that a failure is not determined, manager's investigation of the trace detected in this way is effective. Further, the manager does not have to check the repeatedly outputted same trace upon the normal times upon investigation of a material related to a failure, and can effectively investigate the material. Consequently, it is possible to shorten a recovery time from the failure.

Further, even when a trace having a failure is not recognized in advance as in the situations (a) to (c) described in the comparative example, the trace analyzing unit 32 can reliably detect an appropriate trace related to the failure. For example, the trace analyzing unit 32 can detect a trace outputted only when a potential and new failure occurs or a trace whose character string is determined to be normal (e.g. "Normal End") and which is outputted, too. Consequently, it is possible to collect traces which are hard to determine from fixed characters string such as the degrees of importance (e.g. "ERROR" or "WARNING") defined in advance.

As described above, the trace analyzing unit 32 is an example of a detecting unit which detects a first log item group different from an log item group obtained by the obtaining unit and having the periodicity included in the first log, from a first log which is the analysis target which is selected based on predetermined conditions from a plurality of trace files 41 stored and managed by the holding unit 4.

When notified of information of an anomalous trace group from the trace analyzing unit 32, the related trace group extracting unit 33 extracts the anomalous trace group from the trace file 41, and stores the anomalous trace group as the related trace group 43 in the holding unit 4. That is, as described above, a target for which the trace analyzing unit 32 performs an analysis process is the deletion target trace file 41. Consequently, the related trace group extracting unit 33 can evacuate the trace group as the related trace group 43 to the holding unit 4 by excluding the anomalous trace group notified from the trace analyzing unit 32 from the deletion target.

Further, the related trace group extracting unit 33 specifies (discriminates) a trace group related to an anomalous trace group from a plurality of trace files 41 of the holding unit 4. In addition, the related trace group extracting unit 33 can store a storage position (e.g. an address) of the specified trace group in the holding unit 4 or apply a mark to the specified trace group (e.g. sets an identifiable character string), and store information of the trace file 41 to which the mark has been applied.

Further, the related trace group extracting unit 33 extracts each specified trace group from the trace file 41, and stores the trace file 41 as the related trace group 43 in the holding unit 4. A timing at which each specified trace group is stored is a timing when, for example, the trace file 41 including the specified trace group becomes a deletion target. In this case, the related trace group extracting unit 33 can evacuate the trace group as the related trace group 43 to the holding unit 4 by excluding the specified trace group from the deletion target. Consequently, it is possible to suspend storage of the related trace group 43 until the trace file becomes a deletion target. Consequently, it is possible to prevent the storage capacity of the storage apparatus from tightening.

In addition, when notified of information of an anomalous trace group from the trace analyzing unit 32, the related trace group extracting unit 33 may immediately extract each trace group related to the anomalous trace group from the corresponding trace file 41, and store each trace group as the related trace group 43 in the holding unit 4.

An example of a process of the related trace group extracting unit 33 when a plurality of processes 20 of the process 20-1 to 20-3 operates in a coordinated manner will be described below with reference to FIG. 12. In addition, FIG. 12 illustrates that the trace analyzing unit 32 detects the trace file 41-2 outputted from the process 20-2 as an anomalous trace group due to a defect of "trace xxxx 2".

In this case, the related trace group extracting unit 33 extracts a synchronous cycle including a portion at which the trace of the trace file 41-2 is defective, i.e., the anomalous trace group from the trace file 41, and stores the anomalous trace group as the related trace group 43 in the holding unit 4.

Further, the related trace group extracting unit 33 specifies trace groups of the trace files 41-1 and 41-3 which correspond to anomalous trace groups and have been outputted from the other processes 20-1 to 20-3 in the same period (same time zone). When each of the trace files 41-1 and 41-3 including the specified trace groups become a deletion target, the related trace group extracting unit 33 extracts the specified trace group from the trace file 41 and stores the specified trace group as the related trace group 43 in the holding unit 4.

Figure 12:
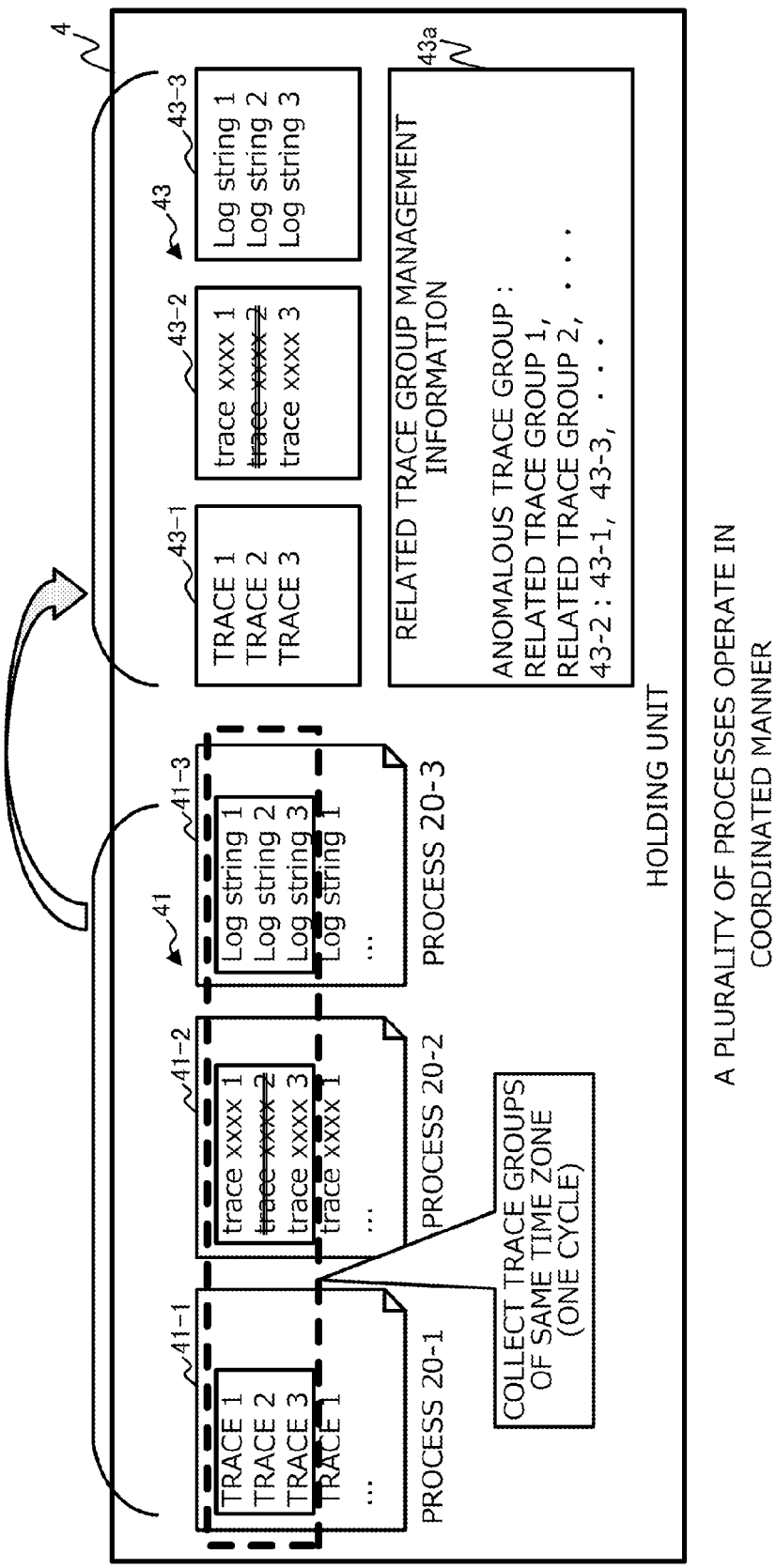
FIG. 12 is a view for explaining an example of a process of a related trace extracting unit.

In addition, the related trace group extracting unit 33 may associate and manage the anomalous trace group and one or more specified trace groups when storing the related trace group 43 (see, for example, the related trace group management information 43a in FIG. 12). Consequently, the manager can easily recognize the related trace groups 43 which relate to each other, and shorten a time used to investigate a failure cause.

Thus, the related trace group extracting unit 33 can collect other trace groups outputted in the same time zone (one cycle) as the anomalous trace group over the processes 20 as illustrated in FIG. 12.

Figure 13:
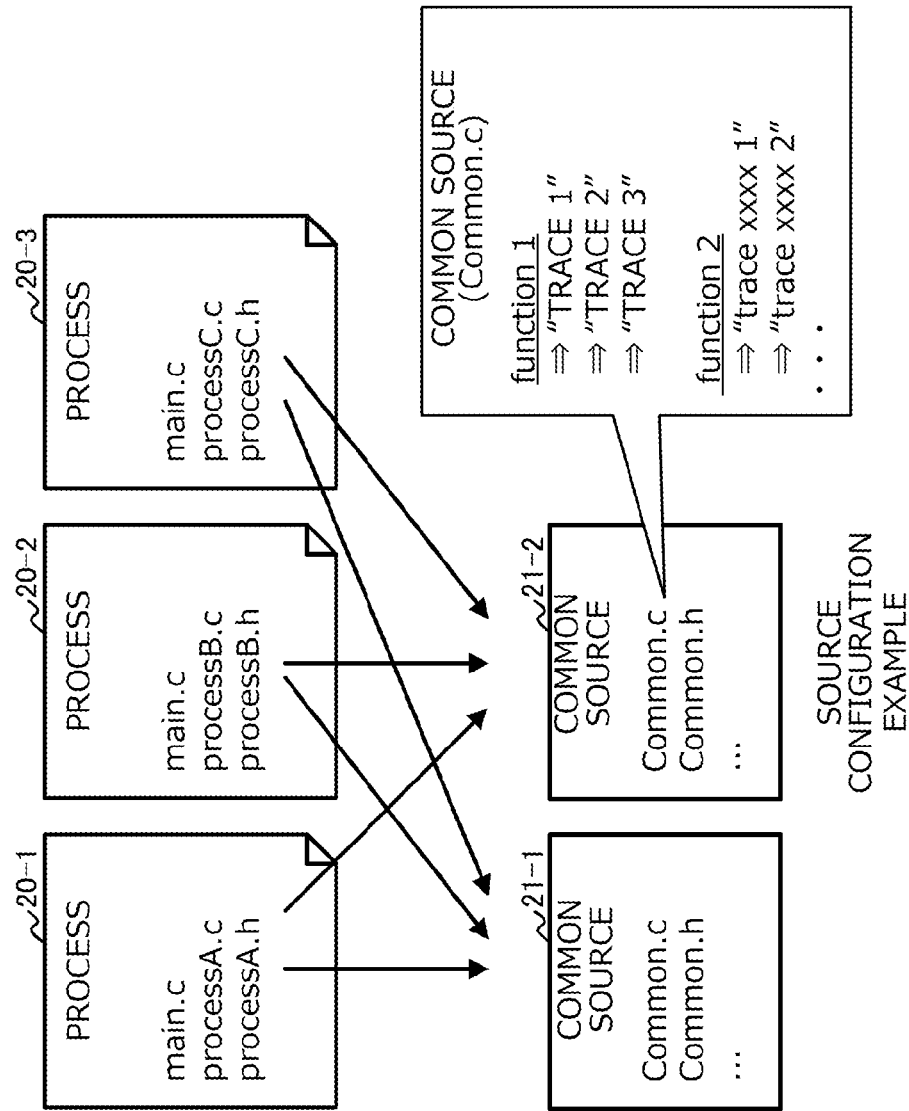
FIG. 13 is a view illustrating a configuration example of sources of processes illustrated in FIG. 12.

In this regard, when the processes 20-1 to 20-3 operate in a coordinated manner, as illustrated in FIG. 13, it is assumed that the processes 20-1 to 20-3 use the common sources 21-1 and 21-2. The common functions in the common sources 21-1 and 21-2 output traces when executed by the process 20. In addition, as illustrated in, for example, FIG. 13, the common functions are classified into functions such as "function1" which is a network related function and "function2" which is a file creation function.

Even in case of source configurations illustrated in FIG. 13, "function1" can be normally executed when, for example, a failure occurs, so that the manager can determine based on the related trace groups 43 of the processes 41-1 and 41-3 that there is no problem in the network. Thus, the manager can use the normal related trace groups 43 of the process 20-1 and 20-3 to investigate a system status, narrow a doubtful failure portion and an influence range of a monitoring target (source) failure, and identify a cause that an anomalous trace group has been outputted.

Next, an extraction range (identification range) of the related trace groups 43 to be extracted by the related trace group extracting unit 33 will be described.

Figure 14:
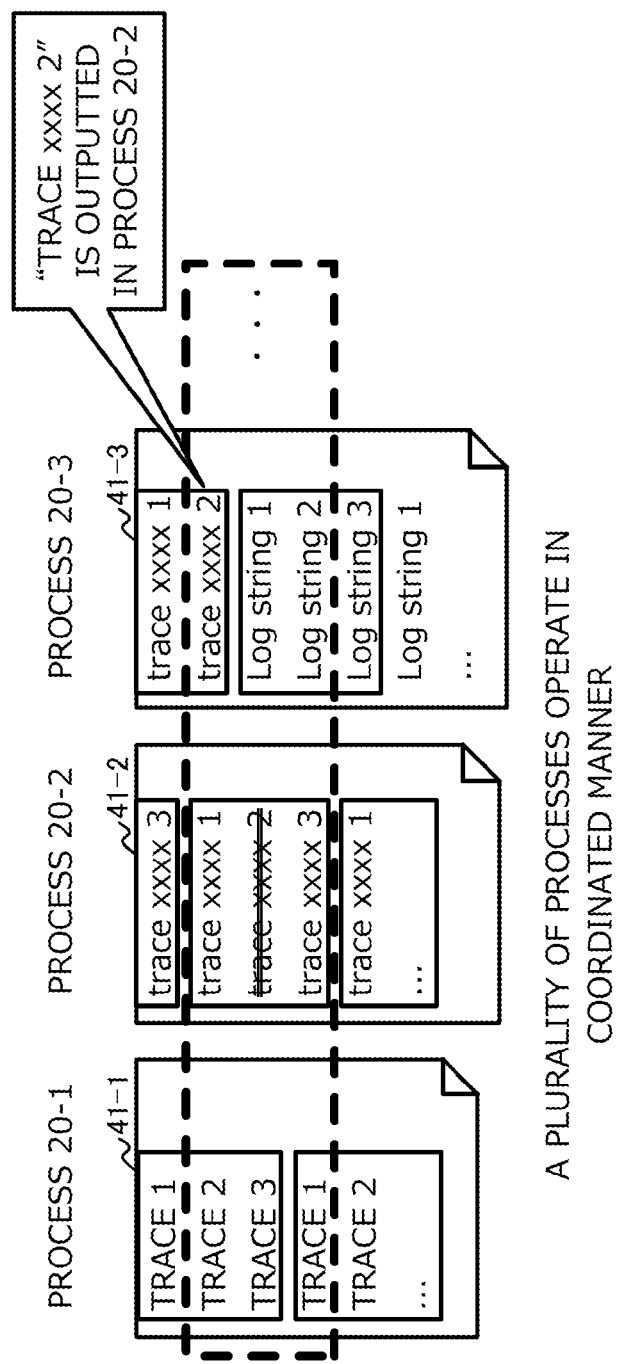
FIG. 14 is a view for explaining an example of a related trace extraction range of the related trace extracting unit.

As illustrated in FIG. 14, when "trace xxxx 2" of the trace file 41-2 of the process 20-2 lacks, that "trace xxxx 2" of the trace file 41-3 of the process 20-3 is outputted in the same time zone is important information to narrow a failure range. The trace "trace xxxx 2" of the process 20-3 can not only narrow an investigation target function (doubtful failure portion) but also investigate a likelihood that some problem has occurred from a time at which the trace "trace xxxx 2" has been outputted from the process 20-3 to a time at which the trace "trace xxxx 2" has not been outputted from the process 20-2. That is, the related trace group extracting unit 33 extracts (stores) trace groups of the other processes 20 in the same time zone as that of an anomalous trace group, so that the manager can narrow a period in which a failure has occurred.

There are the following two examples of ranges in which the related trace group extracting unit 33 extracts (specifies) the related trace group 43 from the trace file 41).

(A) First Example

Figure 15:
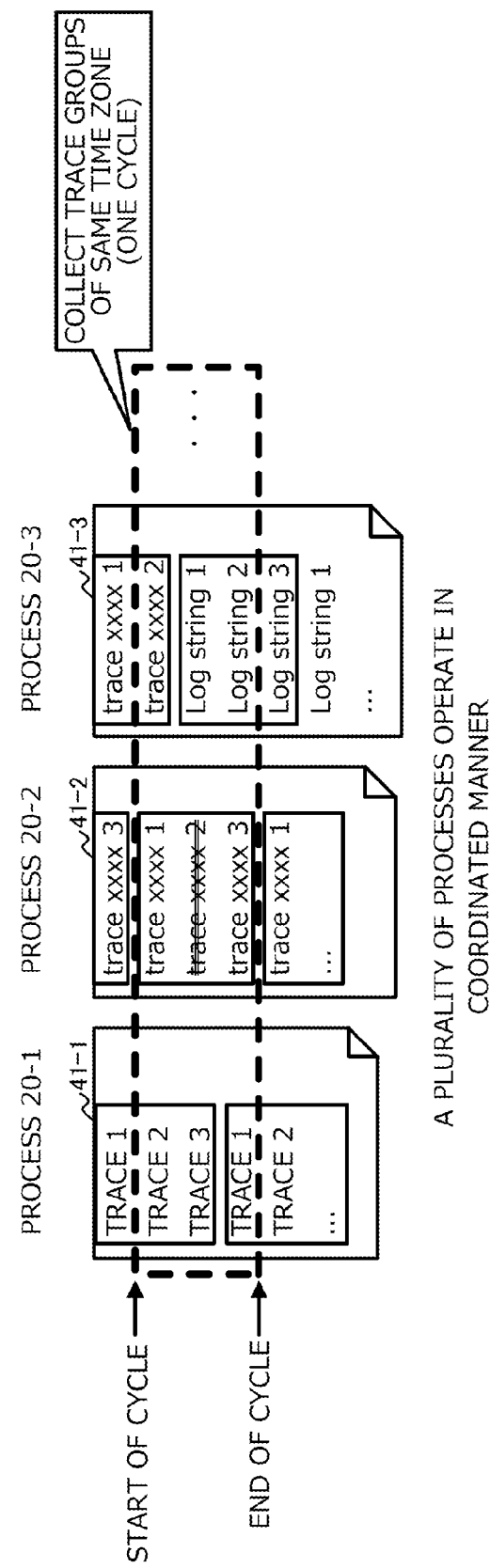
FIG. 15 is a view for explaining a first example of the related trace extraction range of the related trace extracting unit.

As illustrated in FIG. 15, the related trace group extracting unit 33 collects trace groups of the processes 20-1 and 20-3 in a time zone (a start of a cycle to an end of the cycle) of one cycle of the process 20-2 at a time at which the trace "trace xxxx 2" of the process 20-2 has not been outputted. In other words, the related trace group 43 extracted in the first example includes a plurality of traces (log items) related to a period in which an anomalous trace group has been outputted, and included in the trace files 41-1 and 41-3. In addition, the first example is the same as the extraction range illustrated in FIG. 14.

(B) Second Example

Figure 16:
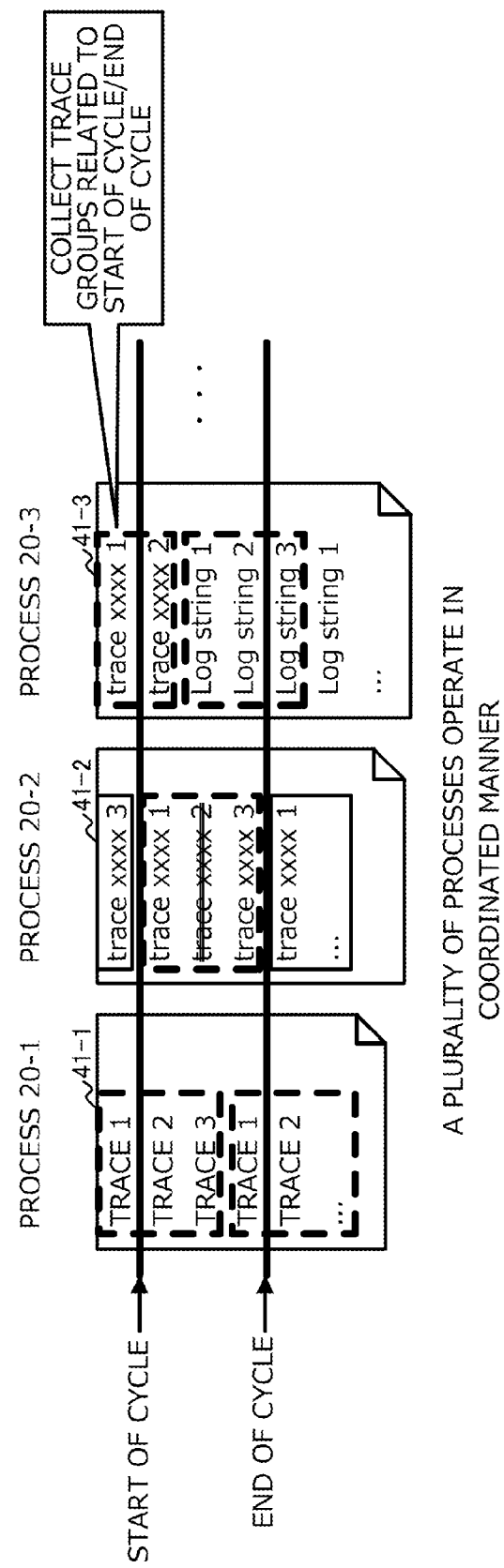
FIG. 16 is a view for explaining a second example of the related trace extraction range of the related trace extracting unit.

As illustrated in FIG. 16, the related trace group extracting unit 33 collects trace groups of the processes 20-1 and 20-3 in a time zone (a start of a cycle to an end of a cycle) of one cycle of the process 20-2 at a time at which the trace "trace xxxx 2" of the process 20-2 has not been outputted. In other words, the related trace group 43 extracted in the second example is a trace group related to the period in which an anomalous trace group has been outputted, and having a periodicity in the trace files 41-1 and 41-3.

The related trace group extracting unit 33 extracts the related trace groups 43 as in the second example, so that it is possible to find that the processes of the relevant processes 20-1 and 20-3 are normal before and after the time at which the trace "trace xxxx 2" of the process 20-2 has not been outputted. That is, it is possible to narrow a failure occurrence portion to a process of the process 20-2.

Thus, the related trace group extracting unit 33 extracts a plurality of related trace groups 43 including anomalous trace groups, and store a plurality of related trace groups 43 in the holding unit 4. Consequently, it is possible to reliably keep information which is useful for the manager to investigate a cause, and prevent a solution deadline from being extended since the manager needs to wait for reoccurrence of a failure due to lack of information and prevent cost of reinvestigation.

As described above, the related trace group extracting unit 33 is an example of an specifying unit which specifies a second log item group outputted in the same period as that of the first log item group, from the second log related to the first log.

Further, the related trace group extracting unit 33 is an example of an output unit which extracts the first log item group from the first log and outputs the first log item group, and extracts a second log item group specified by the specifying unit from the second log, and outputs the second log item group.

[2-3] Explanation of Series of Processed Performed by Log Management Process

Figure 17:
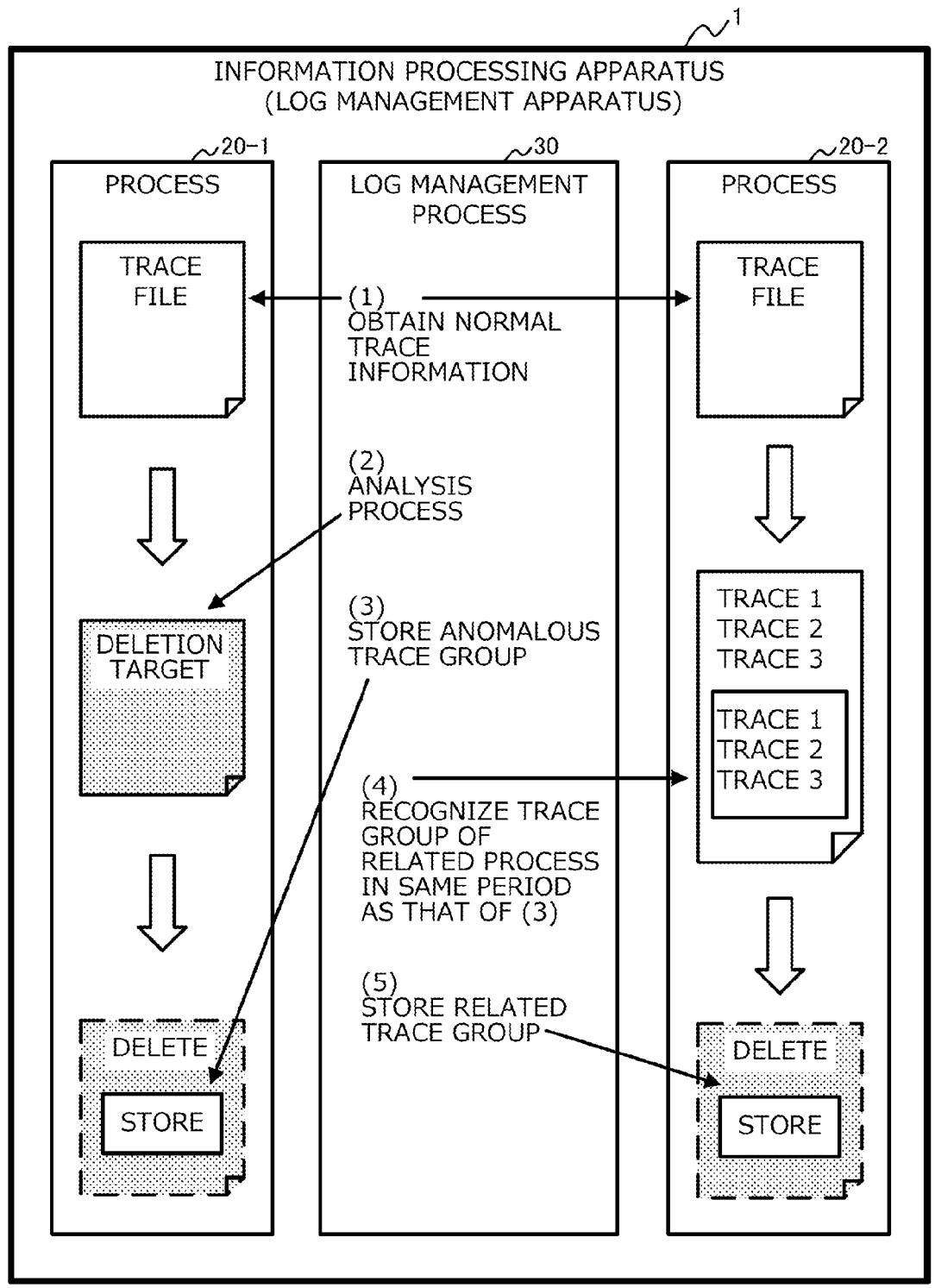
FIG. 17 is a view for explaining an example of a series of processes of the information processing apparatus according to one embodiment.
Figure 18:
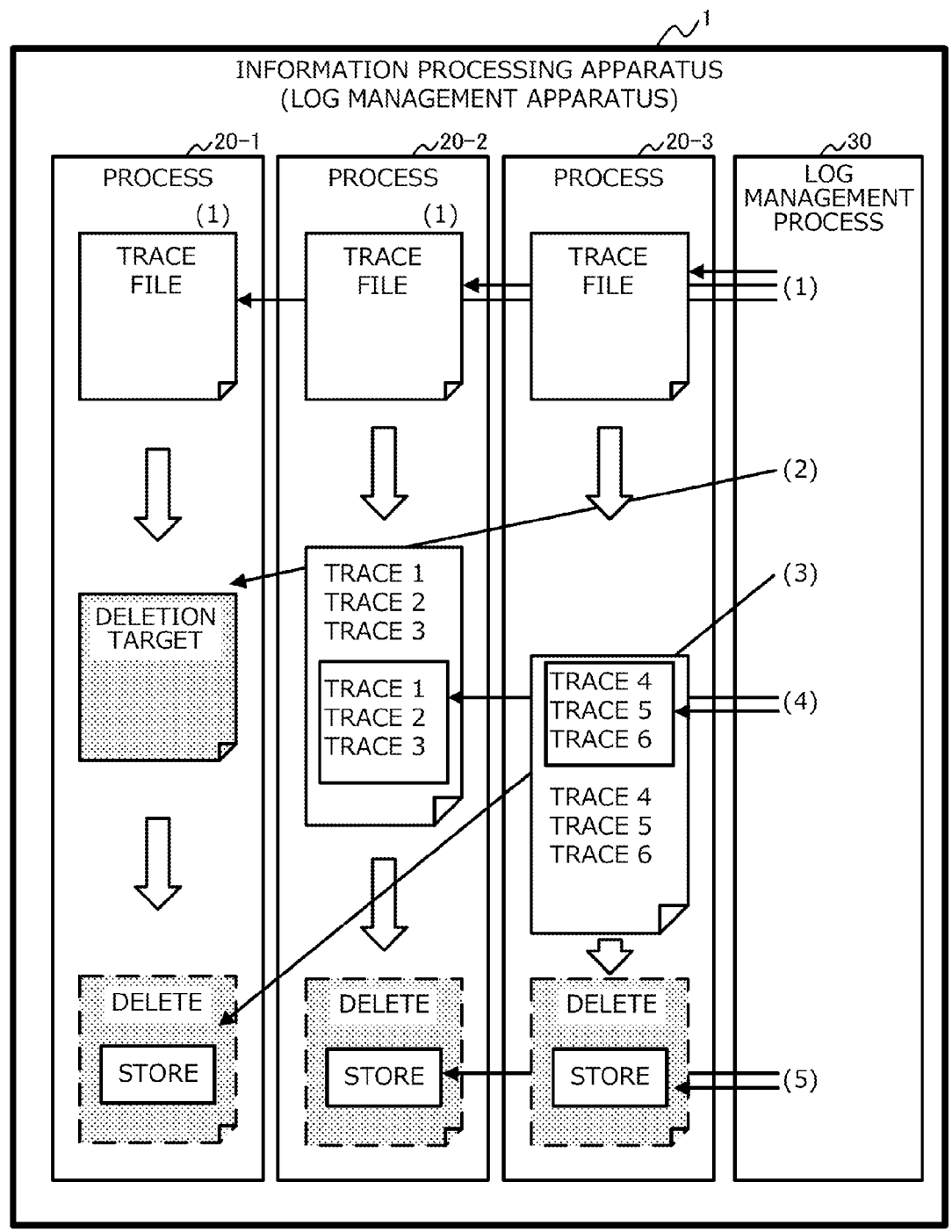
FIG. 18 is a view for explaining an example of a series of processes of the information processing apparatus according to one embodiment.

Next, a series of processes of the information processing apparatus 1 (log management process 30) will be described with reference to FIGS. 17 and 18. In addition, FIG. 17 illustrates an operation example of the information processing apparatus 1 when the processes 20-1 and 20-2 operate in a coordinated manner. FIG. 18 illustrates an operation example of the information processing apparatus 1 when the processes 20-1 to 20-3 operate in a coordinated manner.

As illustrated in FIGS. 17 and 18, the normal trace obtaining unit 31 obtains the normal trace information 42 from the trace file 41 outputted from each process 20 (see (1)). In addition, the normal trace obtaining unit 31 obtains the normal trace information 42 from the trace files 41 of the processes 20-1 and 20-2 in an example in FIG. 17 and the trace files 41 of the processes 20-1 to 20-3 in an example in FIG. 18, respectively.

Next, the trace analyzing unit 32 analyzes the deletion target trace file 41 based on the normal trace information 42 at, for example, a timing at which the process 20-1 deletes the trace file 41 (see (2)).

When an output of an anomalous trace is detected by the analysis process, the related trace group extracting unit 33 stores the anomalous trace group of the process 20-1 as the related trace group 43 in the holding unit 4 (see (3)).

Further, the related trace group extracting unit 33 specifies (applies marks to) trace groups of the other process 20 related to the anomalous trace groups (see (4)). In addition, the related trace group extracting unit 33 specifies the trace group (the "trace 1" to the "trace 3") of the trace file 41 of the process 20-2 in the examples in FIGS. 17 and 18, and further specifies a trace group (the "trace 4" to the "trace 6") of the process 20-3 in the example in FIG. 18.

Further, the related trace group extracting unit 33 stores the specified trace group as the related trace group 43 in the holding unit 4 when the trace files 41 including the specified trace groups become deletion targets (see (5)).

[2-4] Operation Example of Information Processing Apparatus

Next, an operation example of the information processing apparatus 1 according to one embodiment configured as described above will be described with reference to FIG. 19. In addition, it is assumed that an application such as an operation management tool is executed on the OS of the information processing apparatus 1.

Figure 19:
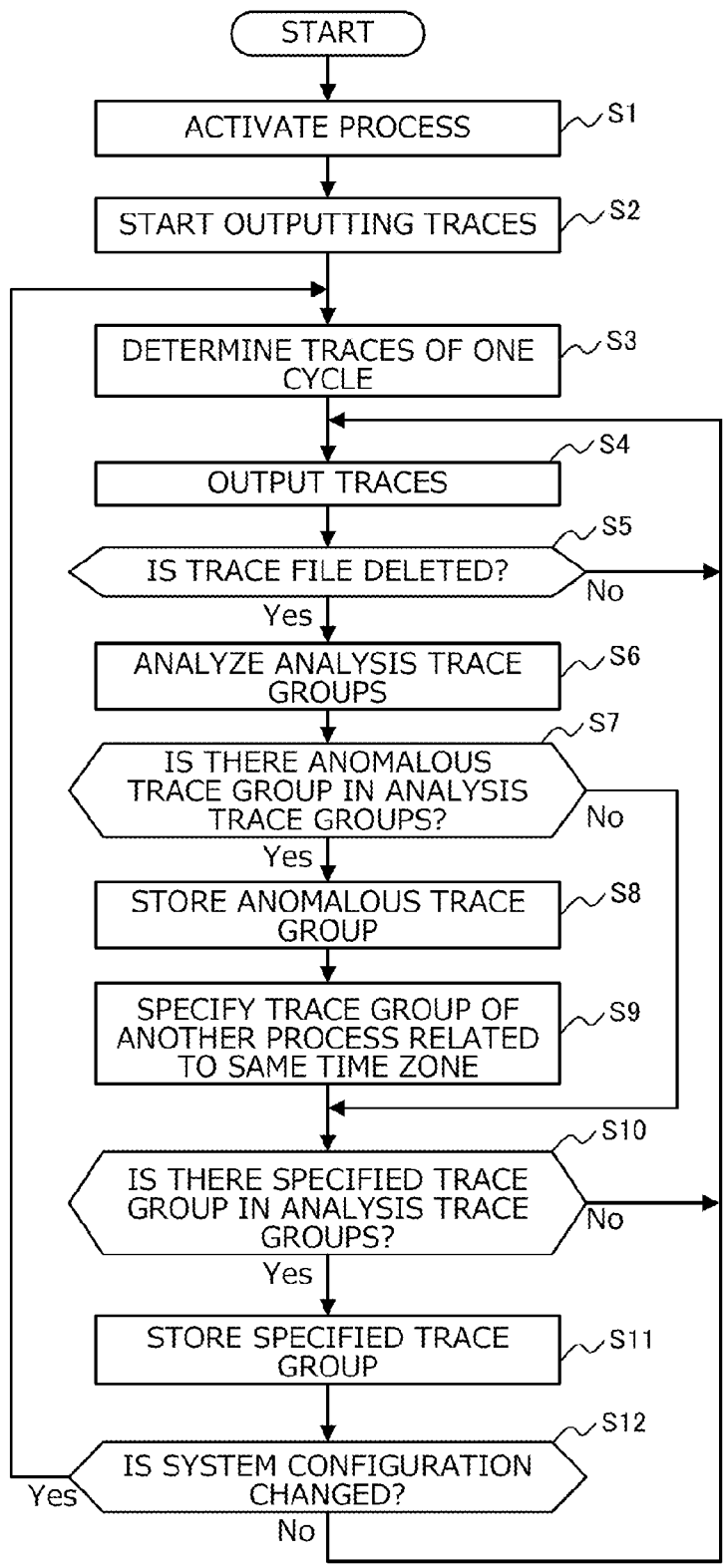
FIG. 19 is a flowchart for explaining an example of a process of the information processing apparatus according to one embodiment.
Figure 20:
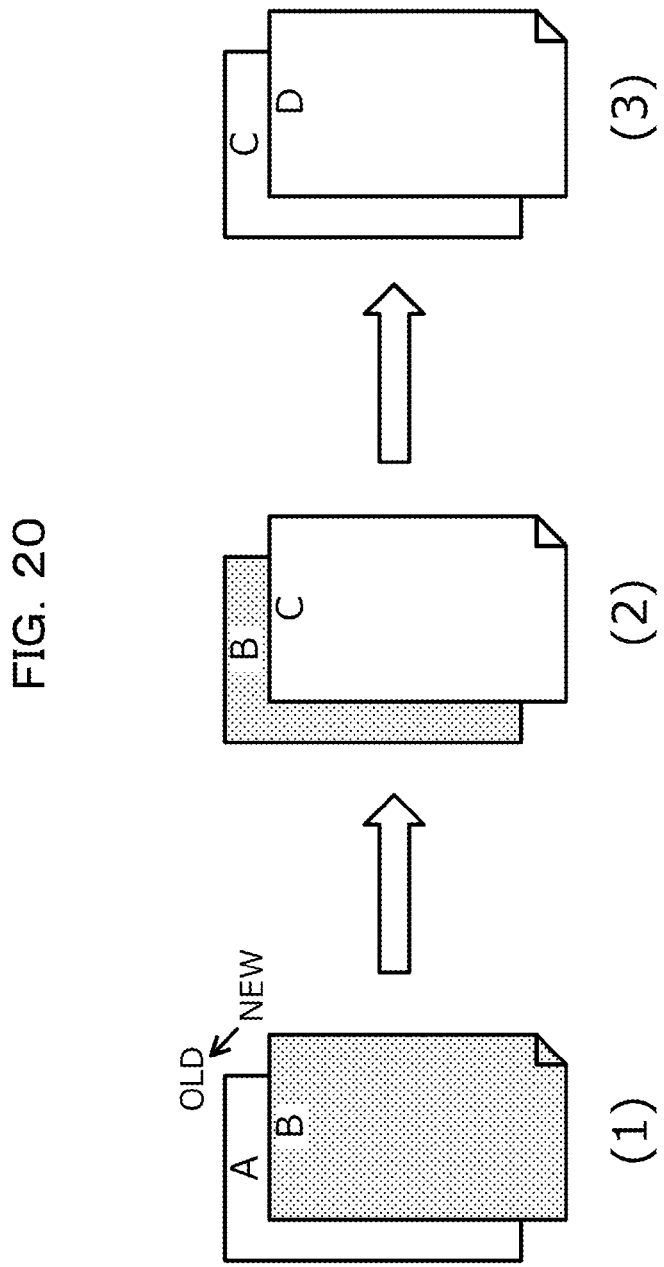
FIG. 20 is a view illustrating an example where log files are overwritten in the information processing apparatus.

First, as illustrated in FIG. 19, the process 20 of the operation management tool is activated (step S1), and the activated process 20 starts continuously outputting the trace files 41 (step S2).

In the log management process 30, the normal trace obtaining unit 31 monitors the trace files 41 and determines traces of one cycle (step S3). Further, the normal trace obtaining unit 31 obtains the normal trace information 42, and stores the normal trace information 42 in the holding unit 4.

When the process 20 outputs the trace files 41 (step S4), the trace analyzing unit 32 determines whether or not each trace file 41 is deleted (step S5). When the trace file 41 is not deleted (a No route in step S5), the process moves to step S4.

Meanwhile, when the trace file 41 is deleted (a Yes route in step S5), the trace analyzing unit 32 extracts an analysis trace group from the trace file 41 which is a deletion target (analysis target), and analyzes the extracted analysis trace group (step S6). Further, the trace analyzing unit 32 determines whether or not there is an anomalous trace group including an anomalous trace in the analysis trace group based on the normal trace information (step S7).

When there is the anomalous trace group in the analysis trace group (a Yes route in step S7), the related trace group extracting unit 33 extracts the anomalous trace group from the deletion target trace file 41, and stores the anomalous trace group as the related trace group 43 in the holding unit 4 (step S8). Further, the related trace group extracting unit 33 specifies the trace groups of the relevant other processes 20 outputted in the same time zone as that of the anomalous trace group (step S9), and the process moves to step S10.

In addition, in step S7, when there is not the anomalous trace group in the analysis trace group (a No route in step S7), the process skips steps S8 and S9 and moves to step S10.

In step S10, the related trace group extracting unit 33 determines whether or not there are specified trace groups of the trace files 41 of the other processes 20 which have been specified (to which the marks have been applied) in step S9 in the analysis trace group. When there are not the specified trace groups in the analysis trace group (a No route in step S10), the process moves to step S4.

Meanwhile, when there are the specified trace groups in the analysis trace group (a Yes route in step S10), the related trace group extracting unit 33 extracts the specified trace group from the deletion target trace file 41, and stores the specified trace group as the related trace group 43 in the holding unit 4 (step S11).

The log management process 30 determines whether or not a system configuration is changed (step S12). When the configuration is changed (a Yes route in step S12), the process moves to step S3 to obtain the normal trace information 42 again. Meanwhile, when the configuration is not changed (a No route in step S12), the process moves to step S4.

As described above, the log management process 30 can output an appropriate log item related to a failure.

Further, the log management process 30 performs control to perform trace analysis and dynamic marking in a process different from the process 20. Consequently, it is possible to prevent an execution time (performance) of the process 20 from lowering due to log management, and store only traces which are useful to investigate a failure cause with minimum program patches.

Depending on the process 20, the number of times of output of traces is a little. Even when one row of traces which are outputted less number of times is stored, it is difficult to investigate a failure cause.

In the present embodiment, focusing upon that the monitoring process (demon process) of checking whether or not an application is alive outputs similar traces on a regular basis, the related trace group 43 of one cycle including anomalous traces is collected based on a trace group of one normal cycle. Consequently, when there are anomalous traces which are outputted less number of times, traces before and after the anomalous traces and traces of the other processes 20 which are outputted in the same time zone can be stored. Consequently, it is possible to prevent a material which is useful for investigation from being overwritten, and output a maintenance material which is able to shorten a failure resolution time.

Further, only the related trace group 43 including an anomalous trace group is extracted from the trace file 41 and the trace files 41 are cyclically deleted. Consequently, it is possible to output only a log item which is useful to investigate a failure cause and prevent the storage capacity of the storage apparatus from tightening. When the information processing apparatus 1 is a small apparatus such as a terminal or a wearable device, a storage capacity of the storage apparatus is small, and the number and a size of trace files 41 which can be stored are significantly limited. The log management process 30 according to the present embodiment is suitable for use particularly when the information processing apparatus 1 is a small apparatus.

[3] Others

A preferred embodiments have been described in detail. However, the present invention is not limited to specific embodiments, and can be carried out by being variously deformed and changed without departing from the spirit of the present invention.

For example, each functional block of the information processing apparatus 1 illustrated in FIG. 7 may be arbitrarily combined and integrated or may be divided.

Further, the trace analyzing unit 32 notifies the related trace group extracting unit 33 of information indicating a detected anomalous trace group, and the related trace group extracting unit 33 extracts the anomalous trace group from the trace files 41 and stores the trace files 41 as the related trace group 43. However the present invention is not limited to this. For example, the trace analyzing unit 32 may notify the related trace group extracting unit 33 of information indicating a detected anomalous trace group, extract the anomalous trace group from the trace file 41 and store the trace files 41 as the related trace group 43. In this case, the trace analyzing unit 32 and the related trace group extracting unit 33 are examples of the output unit.

Further, the related trace group extracting unit 33 which is an example of the output unit stores (outputs) the extracted trace group as the related trace group 43 in the holding unit 4. However, the present invention is not limited to this. For example, the related trace group extracting unit 33 may notify (transmitting) another device of the related trace group 43 through the interface unit 1*d* or write the related trace group 43 in the recording medium 1*g* through the rewritably configured reading unit 1*f*, or, in addition, may output the related trace group 43 in various modes.

According to one aspect, it is possible to output appropriate log items related to a failure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a log management program that causes a computer to execute a process comprising:
obtaining a normal log item group from each of a plurality of logs, the plurality of logs being outputted from a plurality of monitoring targets, respectively, each of the normal log item groups being outputted from a corresponding monitorinci target in one cycle of a regular process of the corresponding monitorinci target;
detecting a first log item group from a first log, the first log item group being different from the normal log item group obtained from the first log;
specifying a second log item group from a second log related to the first log, the second log item group being outputted in a same period as that of the first log item group;
extracting the first log item group from the first log, and outputting the first log item group; and
extracting the specified second log item group from the second log, and outputting the second log item group.

2. The non-transitory computer-readable recording medium according to claim 1, wherein the second log item group outputted in the same period as that of the first log item group includes a plurality of log items included in the second log, the plurality of log items being related to a period in which the first log item group has been outputted.

3. The non-transitory computer-readable recording medium according to claim 1, wherein the second log item group outputted in the same period as that of the first log item group is a log item group having the periodicity in the second log, the log item group as the second log item group being related to a period in which the first log item group has been outputted.

4. The non-transitory computer-readable recording medium according to claim 1, wherein
the process further comprises, in the detecting, extracting a log item group of one cycle from the first log which is the analysis target, comparing the extracted log item group of the one cycle and the obtained log item group having the periodicity in the first log, and detecting the extracted log item group of the one cycle as the first log item group according to a comparison result.

5. The non-transitory computer-readable recording medium according to claim 1, wherein the first log is a deletion target log, the deletion target log being deleted by a corresponding monitoring target.

6. The non-transitory computer-readable recording medium according to claim 5, wherein the process further comprises, in the extracting and the outputting of the second log item group, when the second log is the deletion target log, extracting the second log item group from the second log and outputting the second log item group.

7. A log management apparatus comprising
a processor that
obtains a normal log item group from each of a plurality of logs, the plurality of logs being outputted from a plurality of monitoring targets, respectively, each of the normal log item groups being outputted from a corresponding monitoring target in one cycle of a regular process of the corresponding monitoring target,
detects a first log item group from a first log, the first log item group being different from the normal log item group obtained from the first log,
specifies a second log item group from a second log related to the first log, the second log item group being outputted in a same period as that of the first log item group,
extracts the first log item group from the first log, and outputs the first log item group, and
extracts the specified second log item group from the second log, and outputs the second log item group.

8. The log management apparatus according to claim 7, wherein the second log item group outputted in the same period as that of the first log item group includes a plurality of log items included in the second log, the plurality of log items being related to a period in which the first log item group has been outputted.

9. The log management apparatus according to claim 7, wherein the second log item group outputted in the same period as that of the first log item group is a log item group having the periodicity in the second log, the log item group as the second log item group being related to a period in which the first log item group has been outputted.

10. The log management apparatus according to claim 7, wherein
in a process of the detection, the processor extracts a log item group of one cycle from the first log which is the analysis target, compares the extracted log item group of the one cycle and the obtained log item group having the periodicity in the first log, and detects the extracted log item group of the one cycle as the first log item group according to a comparison result.

11. The log management apparatus according to claim 7, wherein the first log is a deletion target log, the deletion target log being deleted by a corresponding monitoring target.

12. The log management apparatus according to claim 11, wherein, in a process of the extraction and the output, when the second log is the deletion target log, the processor extracts the second log item group from the second log and outputs the second log item group.

13. A log management method in an information processing apparatus that manages a plurality of logs outputted from a plurality of monitoring targets, respectively, the log management method comprising:
at a processor of the information processing apparatus,
obtaining a normal log item group from each of the plurality of logs, each of the normal log item groups being outputted from a corresponding monitoring target in one cycle of a regular process of the corresponding monitoring target;
detecting a first log item group from a first log, the first log item group being different from the normal log item group obtained from the first log;
specifying a second log item group from a second log related to the first log, the second log item group being outputted in a same period as that of the first log item group;
extracting the first log item group from the first log, and outputting the first log item group; and
extracting the specified second log item group from the second log, and outputting the second log item group.

14. The log management method according to claim 13, wherein the second log item group outputted in the same period as that of the first log item group includes a plurality of log items included in the second log, the plurality of log items being related to a period in which the first log item group has been outputted.

15. The log management method according to claim 13, wherein the second log item group outputted in the same period as that of the first log item group is a log item group having the periodicity in the second log, the log item group as the second log item group being related to a period in which the first log item group has been outputted.

16. The log management method according to claim 13, wherein the log management method further comprises, at the processor, in the detecting, extracting a log item group of one cycle from the first log which is the analysis target, comparing the extracted log item group of the one cycle and the obtained log item group having the periodicity in the first log, and detecting the extracted log item group of the one cycle as the first log item group according to a comparison result.

17. The log management method according to claim 13, wherein the first log is a deletion target log, the deletion target log being deleted by a corresponding monitoring target.

18. The log management method according to claim 17, further comprising, at the processor, in the extracting and the outputting of the second log item group, when the second log is the deletion target log, extracting the second log item group from the second log and outputting the second log item group.

* * * * *